United States Patent
Bissantz

(10) Patent No.: US 12,153,848 B2
(45) Date of Patent: Nov. 26, 2024

(54) DEVICE COMPRISING REPRODUCTION MEANS, AND METHOD FOR REPRODUCING NUMBERS OR NUMERALS

(71) Applicant: Nicolas Bissantz, Nuremberg (DE)

(72) Inventor: Nicolas Bissantz, Nuremberg (DE)

(*) Notice: Subject to any disclaimer, the term of this patent is extended or adjusted under 35 U.S.C. 154(b) by 1194 days.

(21) Appl. No.: 16/612,429

(22) PCT Filed: May 14, 2018

(86) PCT No.: PCT/EP2018/062354
§ 371 (c)(1),
(2) Date: Feb. 18, 2021

(87) PCT Pub. No.: WO2018/206814
PCT Pub. Date: Nov. 15, 2018

(65) Prior Publication Data
US 2023/0305787 A1 Sep. 28, 2023

(30) Foreign Application Priority Data

May 12, 2017 (DE) ...................... 10 2017 110 406.2

(51) Int. Cl.
*G06F 3/14* (2006.01)
*G06F 40/103* (2020.01)

(52) U.S. Cl.
CPC .......... *G06F 3/1407* (2013.01); *G06F 40/103* (2020.01)

(58) Field of Classification Search
CPC .................... G06F 3/1407; G06F 40/103
See application file for complete search history.

(56) References Cited

U.S. PATENT DOCUMENTS

| | | |
|---|---|---|
| 6,185,582 B1 | 2/2001 | Zellweger et al. |
| 2007/0101252 A1 | 5/2007 | Chamberlain et al. |
| 2013/0293553 A1 | 11/2013 | Burr et al. |
| 2014/0282244 A1* | 9/2014 | Speer .................... G06F 3/0488 715/811 |
| 2016/0335226 A1* | 11/2016 | Chamberlain ...... G06F 3/04847 |

FOREIGN PATENT DOCUMENTS

EP 3340068 A1 6/2018

OTHER PUBLICATIONS

International Application No. PCT/EP2018/062354, International Search Report and Written Opinion, dated Aug. 6, 2018.

* cited by examiner

*Primary Examiner* — Ryan R Yang
(74) *Attorney, Agent, or Firm* — MARSHALL, GERSTEIN & BORUN LLP

(57) ABSTRACT

The invention relates to a device having reproduction means for reproducing numbers or numerical words, having determination means for calculating the value of the number or numerical word, and having allocation means which are configured to allocate to the number or numerical word, on the basis of the value of the number or numerical word calculated by the determination means, the size of the number or numerical word and/or at least one parameter relating to the color of the number or numerical word and/or of the background thereof, and wherein the reproduction means are configured to represent the number or numerical word on the reproduction means with the allocated size and/or the allocated color parameter.

20 Claims, 44 Drawing Sheets

FIG. 1

Tables (one category)
Bundesliga

| Club | Points |
|---|---|
| 1. Bayern München | 68 |
| 2. RB Leipzig | 58 |
| 3. TSG Hoffenheim | 51 |
| 4. Bor. Dortmund | 50 |
| 5. Hertha BSC | 43 |
| 17. FC Ingolstadt | 28 |
| 18. Darmstadt | 15 |

BEFORE

| Club | Points |
|---|---|
| 1. Bayern München | 68 |
| 2. RB Leipzig | 58 |
| 3. TSG Hoffenheim | 51 |
| 4. Bor. Dortmund | 50 |
| 5. Hertha BSC | 43 |
| 17. FC Ingolstadt | 28 |
| 18. Darmstadt | 15 |

AFTER

FIG. 2

Tables (multiple categories)
Artistic Gymnastics

|  | High Bar | Pommel Horse | Parallel Bars | Rings |
|---|---|---|---|---|
| D. Beljawski | 7,0 | 7,3 | 7,1 | 7,4 |
| O. Wernjajew | 8,5 | 8,5 | 8,7 | 8,6 |
| M. Whitlock | 8,2 | 8,1 | 7,8 | 8,3 |
| K. Uchimura | 9,2 | 9,2 | 9,4 | 9,3 |
| L. Chaopan | 7,8 | 7,9 | 7,7 | 7,9 |

BEFORE

|  | High Bar | Pommel Horse | Parallel Bars | Rings |
|---|---|---|---|---|
| D. Beljawski | 7,0 | 7,3 | 7,1 | 7,4 |
| O. Wernjajew | 8,5 | 8,5 | 8,7 | 8,6 |
| M. Whitlock | 8,2 | 8,1 | 7,8 | 8,3 |
| K. Uchimura | 9,2 | 9,2 | 9,4 | 9,3 |
| L. Chaopan | 7,8 | 7,9 | 7,7 | 7,9 |

AFTER

FIG. 3

Tables (multiple categories)
Medal Table

| Country | GOLD | SILVER | BRONZE | TOTAL |
|---|---|---|---|---|
| United States | 46 | 37 | 38 | 121 |
| Great Britain | 27 | 23 | 17 | 67 |
| China | 26 | 18 | 26 | 70 |
| Russia | 19 | 17 | 19 | 55 |
| Germany | 17 | 10 | 15 | 42 |
| Japan | 12 | 8 | 21 | 41 |
| France | 10 | 18 | 14 | 21 |
| South Korea | 9 | 3 | 9 | 28 |
| Italy | 8 | 12 | 8 | 29 |
| Australia | 8 | 11 | 10 | 19 |
| Netherlands | 8 | 7 | 4 | 15 |

BEFORE

| Country | GOLD | SILVER | BRONZE | TOTAL |
|---|---|---|---|---|
| United States | | | | |
| Great Britain | | | | |
| China | | | | |
| Russia | | | | |
| Germany | | | | |
| Japan | | | | |
| France | | | | |
| South Korea | | | | |
| Italy | | | | |
| Australia | | | | |
| Netherlands | | | | |

AFTER

FIG. 4

Media
Social Media Voting

◀ 98 ▶ Chechenia has arrested 100 homosexual men in first concentration camps since the Holocaust (ibtimes.co.uk) pubished 1 day ago ◀ 84 ▶ It is now prohibited in Russia to share a picture of Putin as a homosexual clown (washingtonpost.com) published 7 days ago ◀ 64 ▶ Taiwan the first country in Asia to probihit the consumption of cat meat and dog meat (chinapost.com.tw) pubsilshed 1 day ago ◀ 61 ▶ United Airlines public relations desaster becomes an international incident in one of their most important markets (cnn.com) published 2 days ago ◀ 49 ▶ Vehicle steered into crowd in Stockholm - BBC News (bbc.co.uk) published 5 days ago

BEFORE

◀ 98 ▶ Chechenia has arrested 100 homosexual men in first concentration camps since the Holocaust (ibtimes.co.uk) pubished 1 day ago ◀ 84 ▶ It is now prohibited in Russia to share a picture of Putin as a homosexual clown (washingtonpost.com) published 7 days ago ◀ 64 ▶ Taiwan the first country in Asia to probihit the consumption of cat meat and dog meat (chinapost.com.tw) pubsilshed 1 day ago ◀ 61 ▶ United Airlines public relations desaster becomes an international incident in one of their most important markets (cnn.com) published 2 days ago ◀ 49 ▶ Vehicle steered into crowd in Stockholm - BBC News (bbc.co.uk) published 5 days ago

AFTER

FIG. 5

Media
Newspaper Article Hits

MOST READ ARTICLES

DORTMUND
Targeted attack on Dortmund's Soccer team

287 . 889  hits

BVB Team Bus Attack
One    suspect    islamist arrested

145 . 609  hits

JARED KUSHNER
Superman in White House

101 . 832  hits

BEFORE

MOST READ ARTICLES

DORTMUND
Targeted attack on Dortmund's Soccer team

287 . 889  hits

BVB Team Bus Attack
One suspect islamist arrested

145 . 609  hits

JARED KUSHNER
Superman in White House

101 . 832  hits

AFTER

FIG. 6A

Media
MOVIE EVALUATIONS

| | | | |
|---|---|---|---|
| Monday comes the windows — 7.5 | Dog days — 5.5 | Miss Julie — 2.4 | Jonas and Lila — 7.6 |
| Kerib the minstrel — 9.1 | The banquet of love — 3.5 | Nothing personal — 2.8 | In the shadows — 8.5 |
| Sector 7 — 8.1 | Lovely Rita — 6.4 | Late Bloomers — 7.2 | The loneliness of the killer before the shot — 6.10 |
| The river was once a man — 3.5 | Battering ram — 8.9 | A girl — 7.4 | The children of the fencer — 6.5 |

1 | 2

BEFORE

FIG. 6B

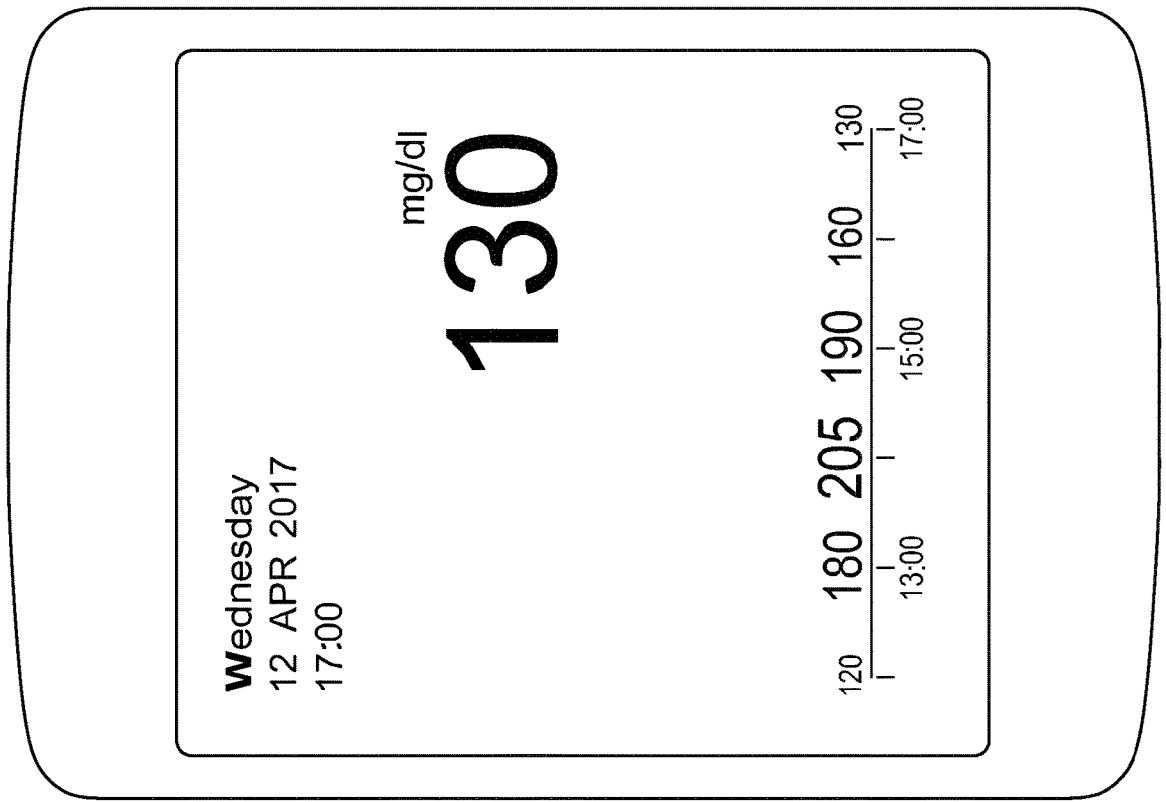

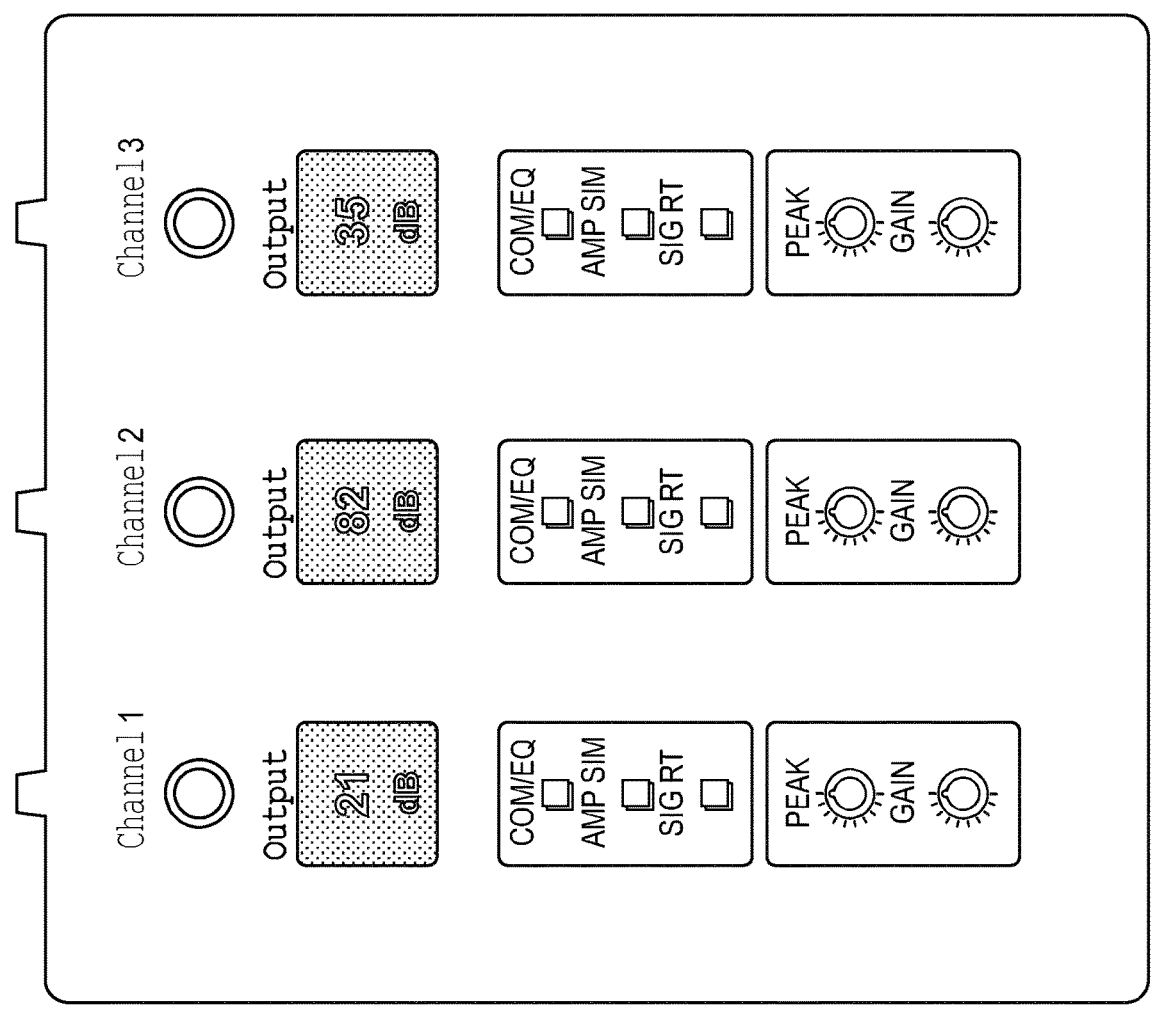

FIG. 9A
Physical Energy-$CO_2$
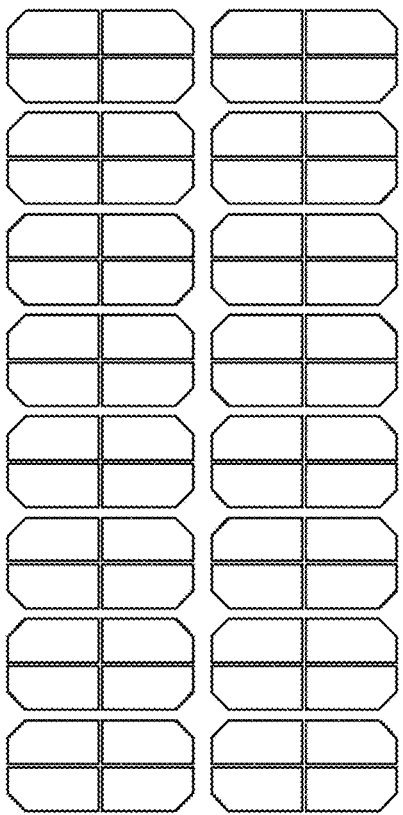
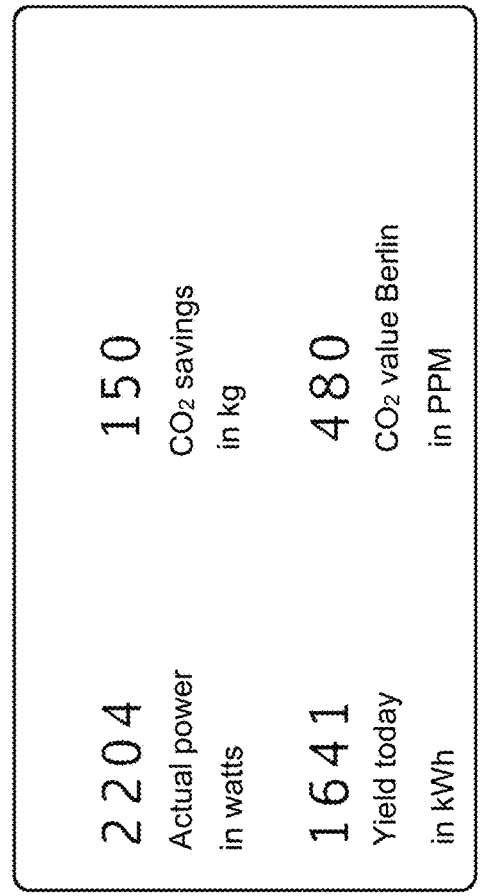
2204 Actual power in watts
150 $CO_2$ savings in kg
1641 Yield today in kWh
480 $CO_2$ value Berlin in PPM
BEFORE

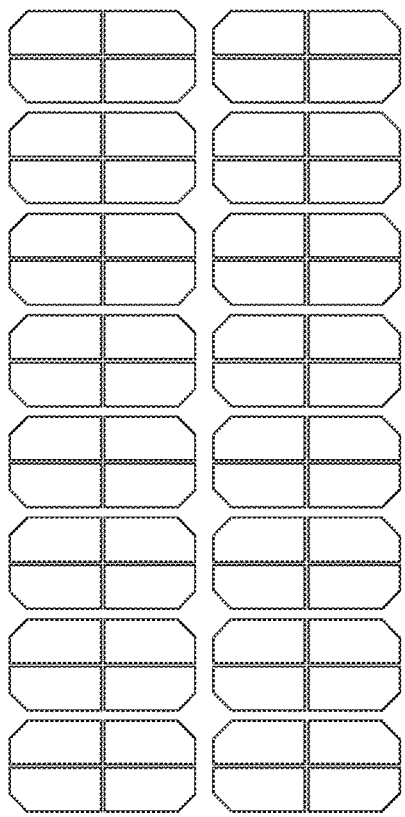
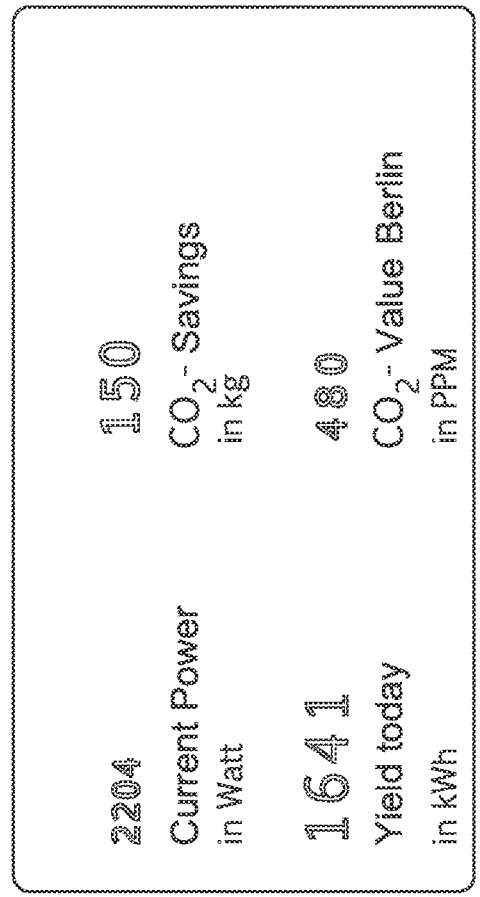
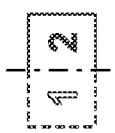
FIG. 9B
BEFORE

FIG. 10

Products
ingredients

PRODUCT 1

ONE PORTION 30G CONTAINS

6%   11%   1%   2%        5%
Calories Sugar Fat saturated Sodium
                   fatty acids of the recommended daily
allowance for an adult

PRODUCT 2

ONE PORTION 250ML CONTAINS

6%   29%   0%   0%        0%
Calories Sugar Fat saturated Sodium
                   fatty acids of the recommended daily
allowance for an adult

BEFORE

PRODUCT 1

ONE PORTION 30G CONTAINS

6%   11%   1%   2%        5%
Calories Sugar Fat saturated Sodium
                   fatty acids of the recommended daily
allowance for an adult

PRODUCT 2

ONE PORTION 250ML CONTAINS

5%   29%   0%   0%        0%
Calories Sugar Fat saturated Sodium
                   fatty acids of the recommended daily
allowance for an adult

AFTER

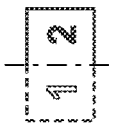
FIG. 12B
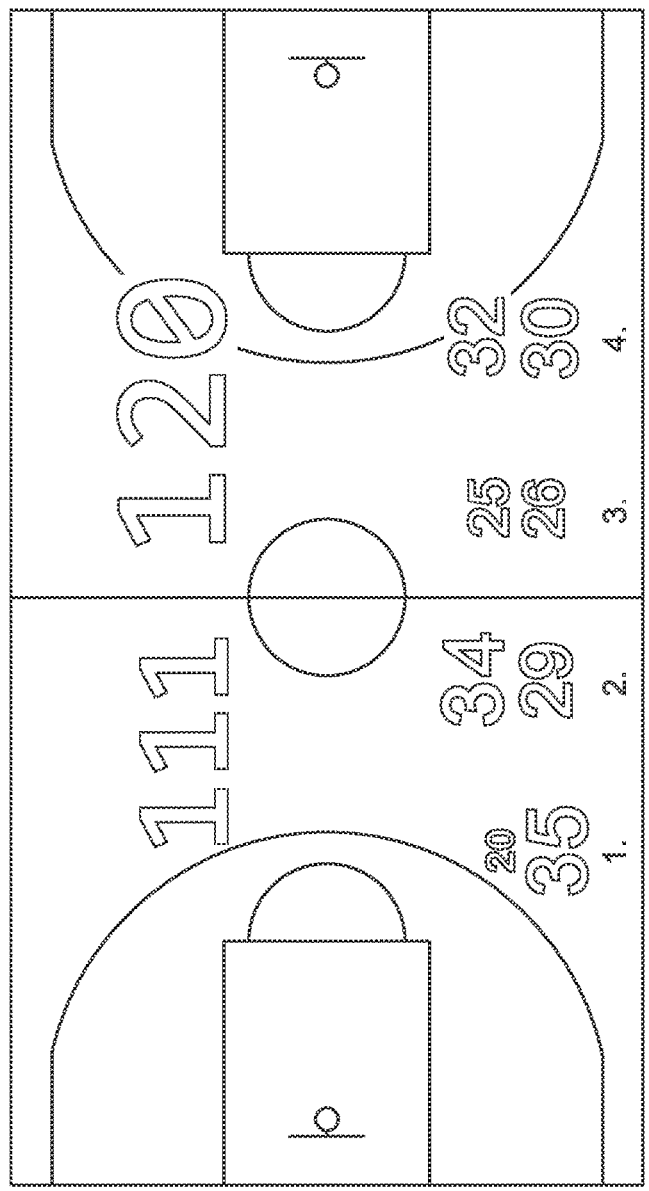
AFTER

FIG. 13

Ratio /Countdown
Lap counter

BEFORE

Round of 8/68
Round of 26/68
Round of 57/68

AFTER

»SAND GLASS«
Round of 8/68 — completed 8 / to do 60
Round of 26/68 — Still 26 / 42
Round of 57/68 — Round 57 / 11 Rounds

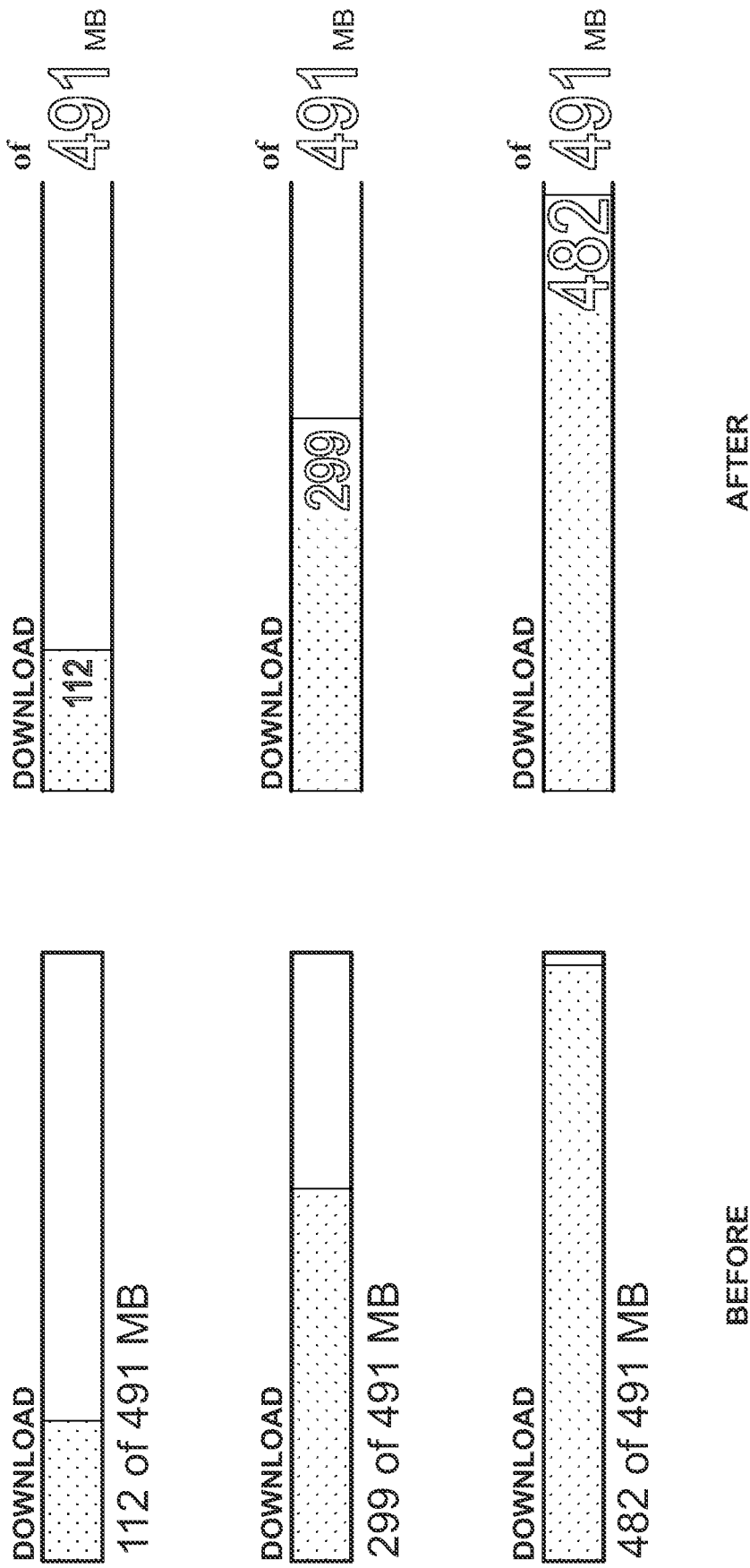

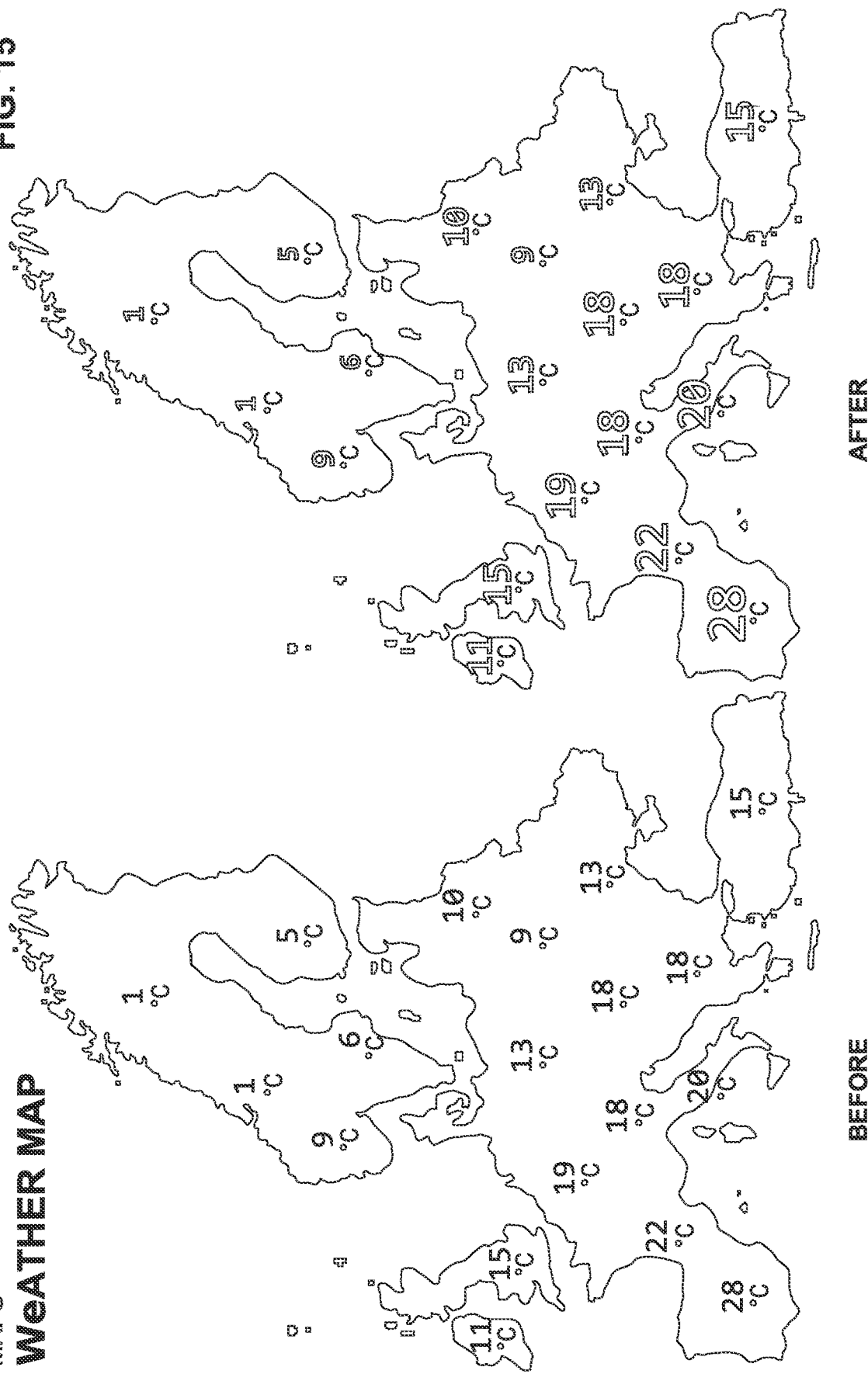

AFTER

SCALING OF TWO DATA ITEMS
Appointment Calender (Number of Appointments)

APRIL 2017

| M | D | M | D | F | S | S |
|---|---|---|---|---|---|---|
|   |   |   |   |   | 1 | 2 • |
| 3 • | 4 • | 5 | 6 | 7 | 8 | 9 • |
| 10 • | 11 • | 12 | 13 • | 14 • | 15 • | 16 • |
| 17 • | 18 • | 19 • | 20 | 21 | 22 • | 23 |
| 24 | 25 | 26 • | 27 | 28 | 29 | 30 |

BEFORE

APRIL 2017

| M | D | M | D | F | S | S |
|---|---|---|---|---|---|---|
|   |   |   |   |   | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

AFTER

FIG. 19

Tabellen
Bundeshaushalt

FIG. 20A

| BRUTTOINVESTITIONEN in Mrd. Euro | BUND | LÄNDER | GEMEINDEN | SOZIAL-VERSICHERUNG |
|---|---|---|---|---|
| Allgemeine öffentliche Verwaltung | 3,44 | 8,61 | 1,60 | 0,52 |
| Verteidigung | 6,06 | 0,00 | 0,00 | 0,00 |
| Öffentliche Ordnung und Sicherheit | 0,26 | 0,96 | 1,19 | 0,00 |
| Wirtschaftliche Angelegenheiten | 6,15 | 5,50 | 7,98 | 0,00 |
| Umweltschutz | 0,74 | 0,32 | 1,66 | 0,00 |
| Wohnungswesen und kommunale Einrichtungen | 0,03 | 0,11 | 2,14 | 0,00 |
| Gesundheitswesen | 0,85 | 0,27 | 0,09 | 0,52 |
| Freizeitgestaltung, Sport Kultur und Religion | 0,19 | 1,22 | 2,47 | 0,00 |
| Bildungswesen | 0,11 | 4,06 | 5,60 | 0,00 |
| Soziale Sicherung | 0,05 | 0,05 | 0,66 | 0,37 |

VORHER

FIG. 20 B

| GROSS INVESTMENT in billions of Euro | COUNTRY | STATES | MUNICIPALITIES | SOCIAL SECURITY |
|---|---|---|---|---|
| General public administration | 3,44 | 8,61 | 1,60 | 0,52 |
| Foreign Affairs / Defense | 6,06 | 0,00 | 0,00 | 0,00 |
| Public order and security | 0,26 | 0,96 | 1,19 | 0,00 |
| Economic affairs | 6,15 | 5,50 | 7,98 | 0,00 |
| Environmental protection | 0,74 | 0,32 | 1,66 | 0,00 |
| Housing and Municipal Entities | 0,03 | 0,11 | 2,14 | 0,00 |
| Health | 0,85 | 0,27 | 0,09 | 0,52 |
| Sports, Culture and Religion | 0,19 | 1,22 | 2,47 | 0,00 |
| Education | 0,11 | 4,06 | 5,60 | 0,00 |
| Social Security | 0,05 | 0,05 | 0,66 | 0,37 |

AFTER

Tabellen
Geschäftsbericht

FIG. 21A

| KENNZAHLEN (BASF) IN MIO. € | 2015 | 2014 | Veränderung |
|---|---|---|---|
| Umsatz Functional Materials &Solutions | 18.523 | 17.725 | 5% |
| Performance Materials | 6.747 | 6.546 | 3% |
| Catalysts | 6.306 | 6.135 | 3% |
| Coatings | 3.166 | 2.984 | 6% |
| Construction Chemicals | 2.304 | 2.060 | 12% |
| EBITDA | 2.228 | 1.678 | 33% |
| Ergebnis der Betriebsfähigkeit vor Sondereinflüssen | 1.649 | 1.197 | 38% |
| Ergebnis der Betriebsfähigkeit (EBIT) | 1.607 | 1.150 | 40% |

VORHER

FIG. 21B

| FIGURES (BASF) IN MIO. € | 2015 | 2014 | change |
|---|---|---|---|
| Sales<br>Functional Materials & Solutions | 18.523 | 17.725 | 5% |
| Performance Materials | 6.747 | 6.546 | 3% |
| Catalysts | 6.306 | 6.135 | 3% |
| Coatings | 3.166 | 2.984 | 6% |
| Construction Chemicals | 2.304 | 2.060 | 12% |
| EBITDA | 2.228 | 1.678 | 33% |
| Result<br>Operating activities before one-off effects | 1.649 | 1.197 | 38% |
| Result (EBIT) | 1.807 | 1.150 | 40% |

AFTER

FIG. 22A

Tabellen
DAX-Werte

| Name | Veränderung | | Name | Veränderung |
|---|---|---|---|---|
| Lufthansa | 4,49% | | Bayer | 0,50% |
| Vonovia | 1,96% | | Deutsche Telekom | 0,33% |
| RWE | 1,59% | | Volkswagen VZ | 0,10% |
| ProSieben Sat1 | 1,40% | | Deutsche Bank | -0,09% |
| SAP | 1,21% | | Deutsche Boerse | -0,41% |
| Continental | 0,94% | | Fresenius Medical | -0,91% |
| Beiersdorf | 0,84% | | Linde | -1,16% |
| BASF | 0,52% | | Heidelberger C | -1,82% |

VORHER

FIG. 22B

| Name | Change | | Name | Change | |
|---|---|---|---|---|---|
| Lufthansa | 4,49% | ⎫ | Bayer | 0,50% | ⎫ |
| Vonovia | 1,96% | ⎪ | Deutsche Telekom | 0,33% | ⎬ Color 1 |
| RWE | 1,59% | ⎪ | Volkswagen VZ | 0,10% | ⎭ |
| ProSieben Sat1 | 1,40% | ⎬ Farbe 1 | Deutsche Bank | -0,09% | ⎫ |
| SAP | 1,21% | ⎪ | Deutsche Boerse | -0,41% | ⎪ |
| Continental | 0,94% | ⎪ | Fresenius Medical | -0,91% | ⎬ Color 2 |
| Beiersdorf | 0,84% | ⎪ | Linde | -1,16% | ⎪ |
| BASF | 0,52% | ⎭ | Heidelberger C | -1,82% | ⎭ |

AFTER

DEVICE COMPRISING REPRODUCTION MEANS, AND METHOD FOR REPRODUCING NUMBERS OR NUMERALS

The invention relates to a device having reproduction means for reproducing numbers or numerical words.

Devices known from the prior art which are designed for reproducing numbers or numerical words can comprise analog and/or digital reproduction means on which corresponding numbers or numerical words are displayed by means of pointers, dials and/or displays.

Numbers or numerical words which may have different relevance for the viewer are thereby displayed. If the device is being used, for example, to reproduce the speed of a vehicle, maximum permissible speeds are of particular interest to the viewer, while other speeds are of secondary importance.

In the case of devices by means of which a large number of numbers or numerical words are displayed, the highest or the lowest numerical values, for example, may be of particular importance to the viewer. This can be the case, for example, with numbers which relate to results of sporting events or to data concerning the economic development of a country or of a region, etc.

It is a disadvantage in this context that the displayed numbers and numerical words are usually reproduced in a format which is uniform and independent of the respective numerical values. As a result, it can be difficult for a viewer to quickly and easily pick out the numbers which are most relevant for him.

Against this background, the object of the invention is to provide an improved device and an improved method by means of which it is easier for a viewer to quickly pick out the numbers that are most relevant for him.

This object is achieved according to the invention by a device having the features of claim 1 and by a method having the features of claim 10. Advantageous embodiments are subject-matter of the dependent claims.

Accordingly, there is provided a device having reproduction means for reproducing numbers or numerical words, having determination means for calculating the value of the number or numerical word. The determination means can of course also calculate the values of a plurality of numbers or numerical words.

The device further comprises allocation means which are configured to allocate to one or more numbers or numerical words, on the basis of the value of the number or numerical word calculated by the determination means, the size of the number or numerical word and/or at least one parameter of the number or numerical word relating to the color and/or of the background thereof. The reproduction means are configured to represent the number or numerical word on the reproduction means with the allocated size and/or the color parameter. The size of the number or numerical word can in particular be the font size of the number or numerical word.

According to the invention, an in particular automated representation of numbers or numerical words is achieved, which permits simple and clear recognition or emphasis of relevant information for a viewer.

In a preferred embodiment of the invention it is conceivable that the allocation means are configured to choose the size of the number or numerical word to be larger according to how large or small the value of the number or numerical word is and/or according to how close the value of the number or numerical word is to a reference value. In the present case and also in the following examples, the reference value can be, for example, an average value of a relevant set of numbers, a target value, a minimum or maximum value, etc.

In a further preferred embodiment it is further conceivable that the parameter or parameters of the color is/are the type of color and/or the color depth. Colors that are particularly noticeable for a human viewer, such as red, or high color depths can thereby be allocated to numbers or numerical words which are particularly relevant for that viewer and which he is therefore to be able to pick out particularly easily and quickly. For example, numbers having a larger value can be represented in dark red, while numbers having a smaller value can be represented in light red.

In a particularly preferred embodiment it is conceivable that the allocation means are configured to choose the color depth to be greater or lesser according to how large or small the value of the number or numerical word is and/or according to how close the value of the number or numerical word is to a reference value.

In a further preferred embodiment it is conceivable that the reproduction means are so configured that exactly one number or exactly one numerical word is displayed simultaneously.

In a further preferred embodiment it is conceivable that the reproduction means are so configured that a plurality of numbers or numerical words are displayed simultaneously, such as, for example, rows of numbers, tables, number fields, etc.

In a particularly preferred embodiment it is conceivable that the plurality of numbers or numerical words are displayed in an ordered, that is to say structured, manner or are components of a table.

In a further preferred embodiment it is conceivable that the reproduction means are configured to arrange the numbers or numerical words in dependence on their value. In particular, this can include the case where the numbers or numerical words are arranged in the order of their values (e.g. from large to small or vice versa).

In a further preferred embodiment it is conceivable that the device is one of the following pieces of equipment or that the device forms part of one of the following pieces of equipment: medical instrument, domestic appliance, tablet, smartphone, computer, television, computer monitor, sports equipment. This list is exemplary in nature and not exhaustive.

The invention is directed further to a method for reproducing numbers or numerical words which has the features of claim 10. Because the method according to the invention can substantially be carried out using the described device, there may be mutually corresponding features and advantages. Features of the device according to the invention can also be features of the method according to the invention and vice versa.

According to the method, the value of the number or numerical word is determined and, on the basis of the determined value of the number or numerical word, the size of the number or numerical word and/or at least one parameter of the number or numerical word relating to the color and/or of the background thereof is allocated. The number or numerical word is then represented with the allocated size and/or the color parameter.

In a preferred embodiment it is conceivable that the size of the number or numerical word is larger according to how large or small the value of the number or numerical word is and/or according to how close the value of the number or numerical word is to a reference value.

In a further preferred embodiment it is conceivable that the parameter or parameters of the color is/are the type of color and/or the color depth.

In a further preferred embodiment it is conceivable that the color depth is chosen to be greater according to how large or small the value of the number or numerical word is and/or according to how close the value of the number or numerical word is to a reference value.

In a further preferred embodiment it is conceivable that exactly one number or exactly one numerical word is displayed. Alternatively, it is, however, also conceivable that a plurality of numbers or numerical words are displayed simultaneously.

In a further preferred embodiment it is conceivable that the plurality of numbers or numerical words are displayed in an ordered manner or are components of a table.

In a further preferred embodiment it is conceivable that the numbers or numerical words are arranged in dependence on their value. The numbers or numerical words can be arranged, for example, according to increasing or decreasing values.

In a further preferred embodiment it is conceivable that the numbers or numerical words are numbers or numerical words that are selected from the following fields: medical values, sports results, positions in tables, technical data, meteorological data, geographical data, food ingredients and/or calendar data. This list too is not exhaustive but exemplary in nature.

The invention is directed further to a product which has been produced by the method according to any one of claims 10 to 18. In a preferred embodiment it is conceivable that the product is printed material.

The printed material can in particular be a book, a journal, a brochure or any other product that is used to represent numbers or numerical words.

Further details and advantages of the invention are explained by way of example with reference to the figures, in which:

FIG. 1: shows a reproduction according to the invention of numbers in tables (right) and a corresponding reproduction according to the prior art (left);

FIG. 2: shows a reproduction according to the invention of numbers in tables with more than one category (right) and a corresponding reproduction according to the prior art (left);

FIG. 3: shows a reproduction according to the invention of numbers in tables with more than one category (right) and a corresponding reproduction according to the prior art (left);

FIG. 4: shows a reproduction according to the invention of numbers in a descending order (right) and a corresponding reproduction according to the prior art (left);

FIG. 5: shows a further exemplary embodiment of a reproduction according to the invention of numbers in a descending order (right) and a corresponding reproduction according to the prior art (left);

Figure 6B:
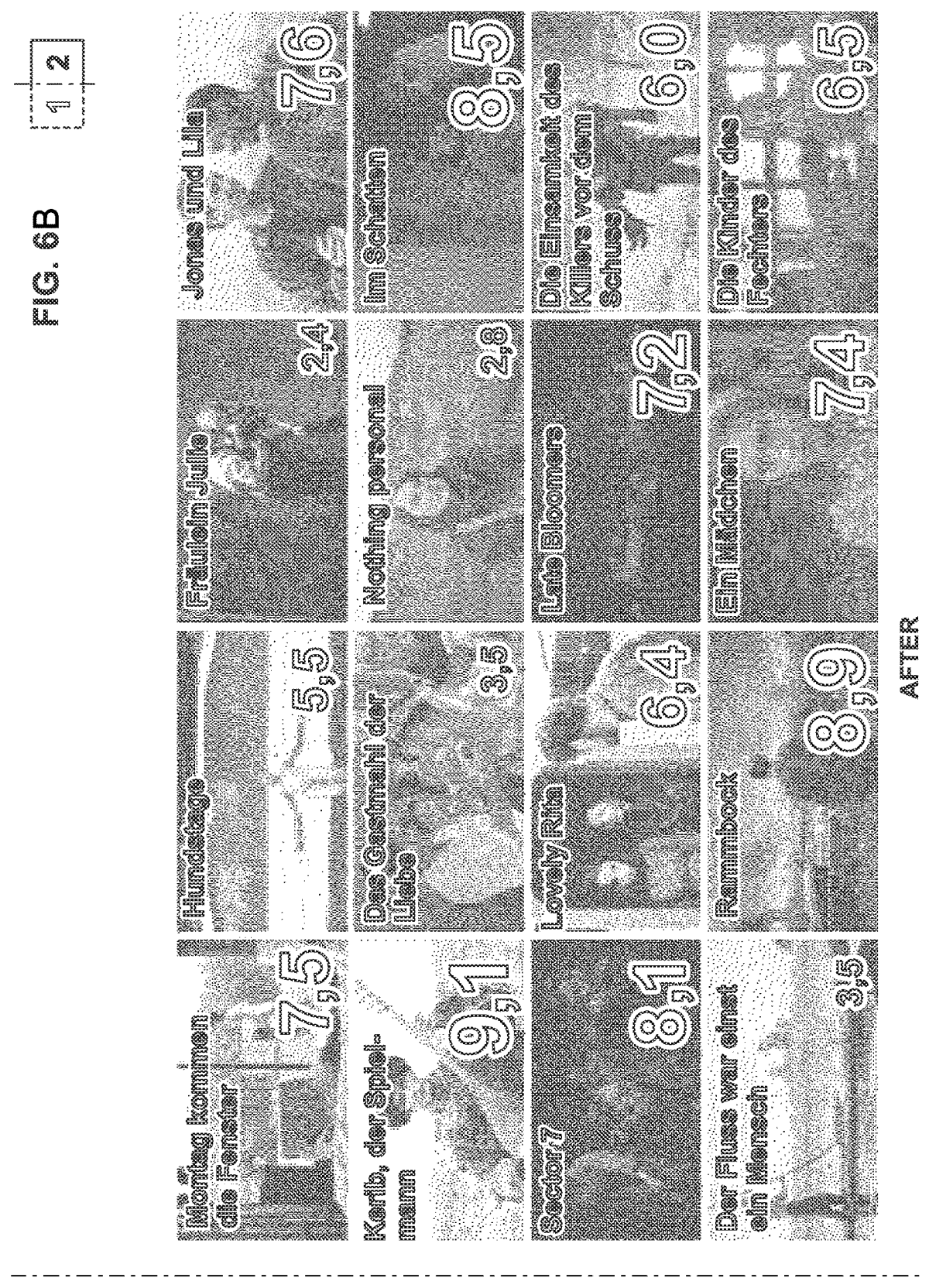

FIG. 6: shows a reproduction according to the invention of numbers in conjunction with further image information (right) and a corresponding reproduction according to the prior art (left);

FIG. 7: shows a reproduction according to the invention of numbers on a medical instrument (right) and a corresponding reproduction according to the prior art (left);

FIG. 8: shows a reproduction according to the invention of numbers on a mixing desk (right) and a corresponding reproduction according to the prior art (left);

FIG. 9: shows a reproduction according to the invention of numbers relating to technical data (right) and a corresponding reproduction according to the prior art (left);

FIG. 10: shows a reproduction according to the invention of numbers relating to foods (right) and a corresponding reproduction according to the prior art (left);

FIG. 11: shows a product produced according to the invention (right) and a corresponding product produced according to the prior art (left);

FIG. 12: shows a reproduction according to the invention of numbers relating to sports results (right) and a corresponding reproduction according to the prior art (left);

FIG. 13: shows a further exemplary embodiment of a reproduction according to the invention of numbers relating to sports results (right) and a corresponding reproduction according to the prior art (left);

FIG. 14: shows a further exemplary embodiment of a reproduction according to the invention of numbers relating to technical data (right) and a corresponding reproduction according to the prior art (left);

FIG. 15: shows a reproduction according to the invention of numbers relating to meteorological data (right) and a corresponding reproduction according to the prior art (left);

FIG. 16: shows a reproduction according to the invention of numbers relating to other types of data (right) and a corresponding reproduction according to the prior art (left);

FIG. 17: shows a further exemplary embodiment of a reproduction according to the invention of numbers relating to technical data (right) and a corresponding reproduction according to the prior art (left);

FIG. 18: shows a reproduction according to the invention of numbers relating to geographical data (right) and a corresponding reproduction according to the prior art (left);

FIG. 19: shows a reproduction according to the invention of numbers relating to calendar data (right) and a corresponding reproduction according to the prior art (left); and FIGS. 20-22: show a reproduction according to the invention of numbers relating to economic data (right) and a corresponding reproduction according to the prior art (left).

FIG. 1 shows in its right-hand region a reproduction according to the invention of numbers in a table. The reproduced numbers can be reproduced by means of a device such as a computer, tablet, smartphone, etc. which can comprise a screen as the reproduction means.

By means of determination means of the computer etc., the values of the numbers are calculated. The calculated values can be used by allocation means of the device to allocate to the numbers corresponding sizes, or font sizes, and/or color parameters. The numbers do not necessarily have to be represented by figures. An embodiment in which the numbers are reproduced as numerical words is also conceivable.

In the exemplary embodiment of FIG. 1, it can be seen on the right that the font size of the reproduced numbers and their color depth correlates proportionally with their value. Accordingly, the larger the reproduced number, the larger the font size in which it is reproduced. A non-proportional relationship is also conceivable and covered by the invention.

However, it can also be provided that the font size and/or color depth correlates indirectly proportionally with the value of the number or is in a different relationship to the value of the number.

According to the right-hand example of FIG. 1, the allocation means can also allocate the color intensity or color depth, in particular automatically, in dependence on the value of the number.

In the left-hand region of FIG. 1, a corresponding reproduction according to the prior art is shown. It will be seen that the numbers shown are reproduced in the same manner (in size and color) independently of their values.

FIGS. 2 and 3 show, in an analogous manner to FIG. 1, the difference between the reproduction according to the invention (right) and the reproduction corresponding thereto and known from the prior art. The same scheme is used in all the further figures, so that there will be no repetitions in this respect.

In contrast to FIG. 1, FIGS. 2 and 3 each show a table with more than one category or column. This type of tabular reproduction of numbers can, however, equally be reproduced according to the invention.

FIGS. 4 and 5 show a reproduction according to the invention of numbers in descending order, it being possible for text information also to be displayed together with the reproduction of numbers. The reproduction means can accordingly not be limited to the reproduction of numbers, but they can also reproduce any desired further information.

FIG. 6 shows that image information, for example, comes into consideration as further information which can be displayed together with the numbers.

Figure 7A:
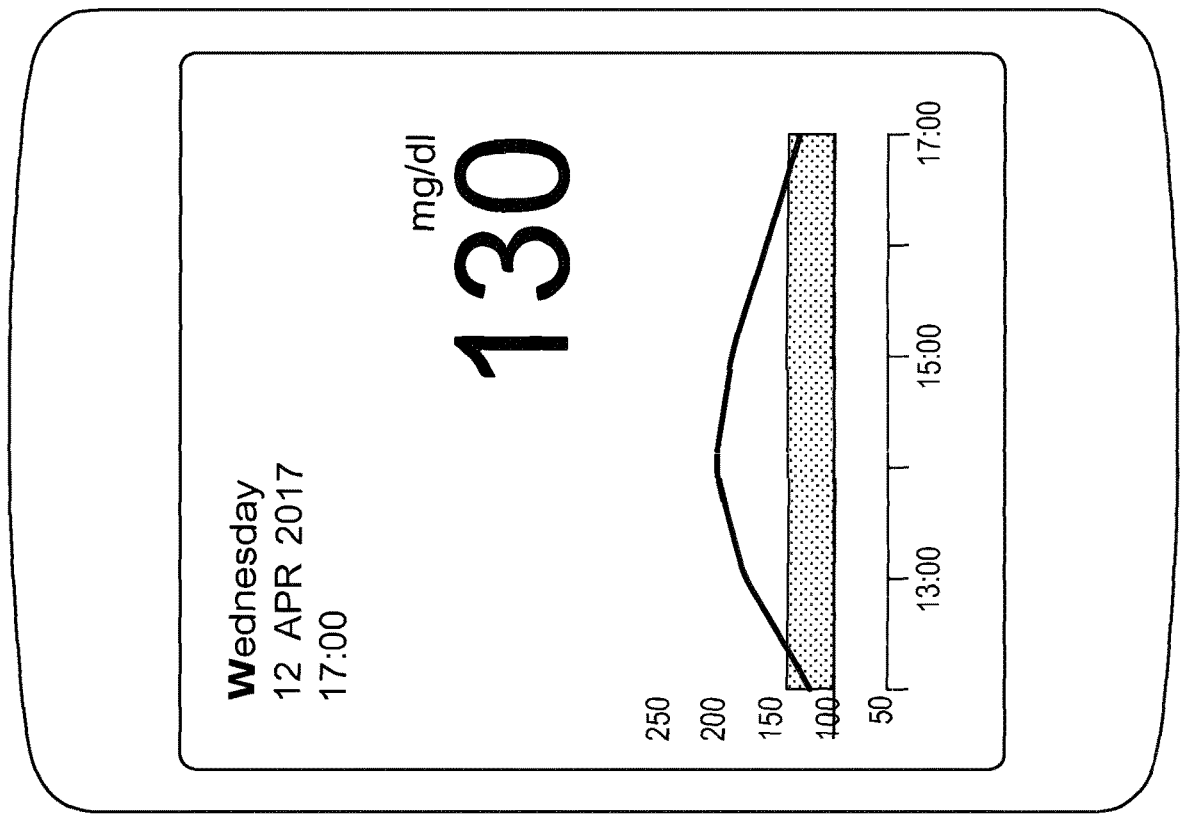

FIG. 7 shows a device according to the invention in the form of, by way of example, a medical instrument which can be configured to display glucose levels. The chronological profile of the glucose levels can take place according to the invention by the reproduction of numbers of different sizes. The reproduced numbers can accordingly be arranged chronologically.

Figure 8B:
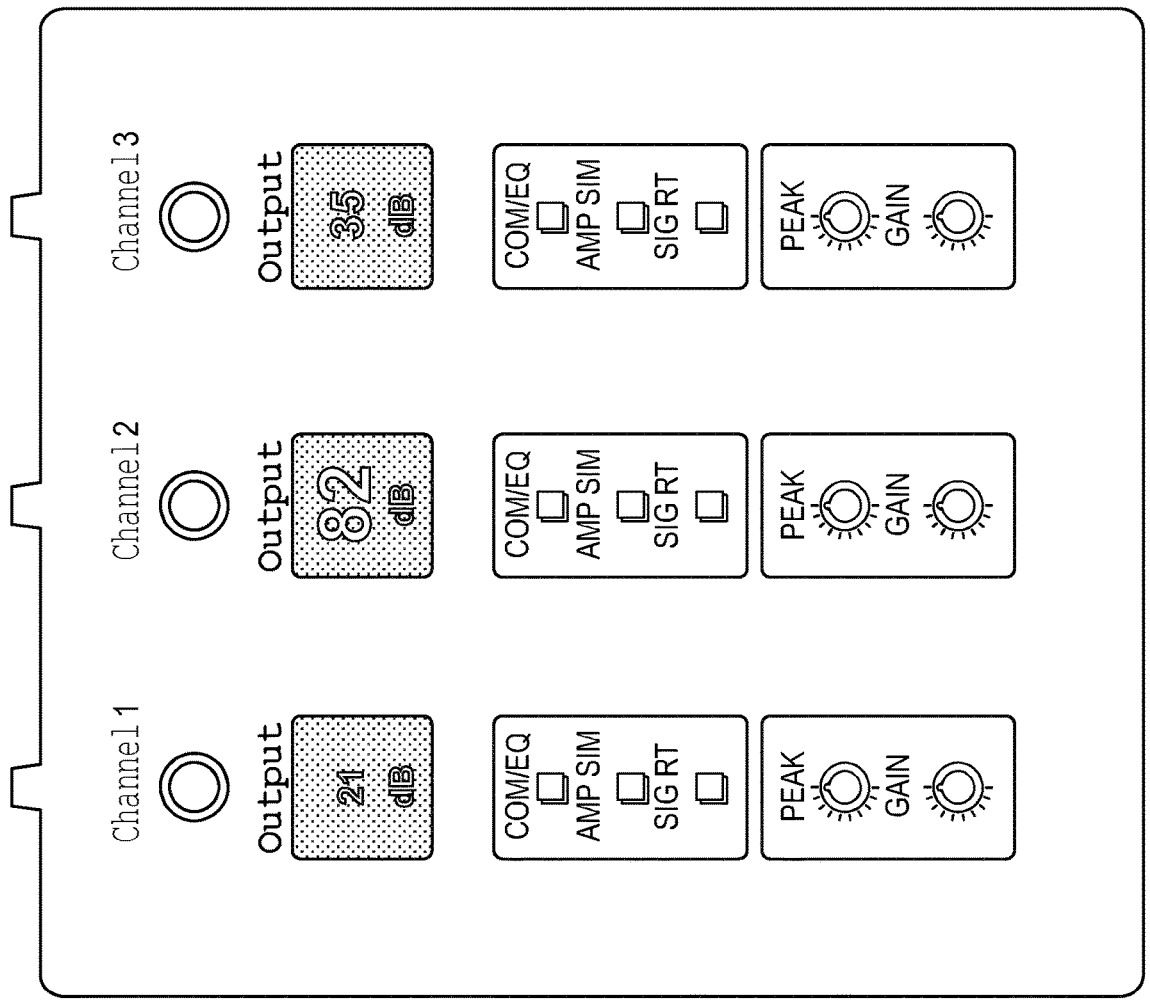

FIG. 8 shows the reproduction according to the invention of numbers on a mixing desk.

Figure 17A:
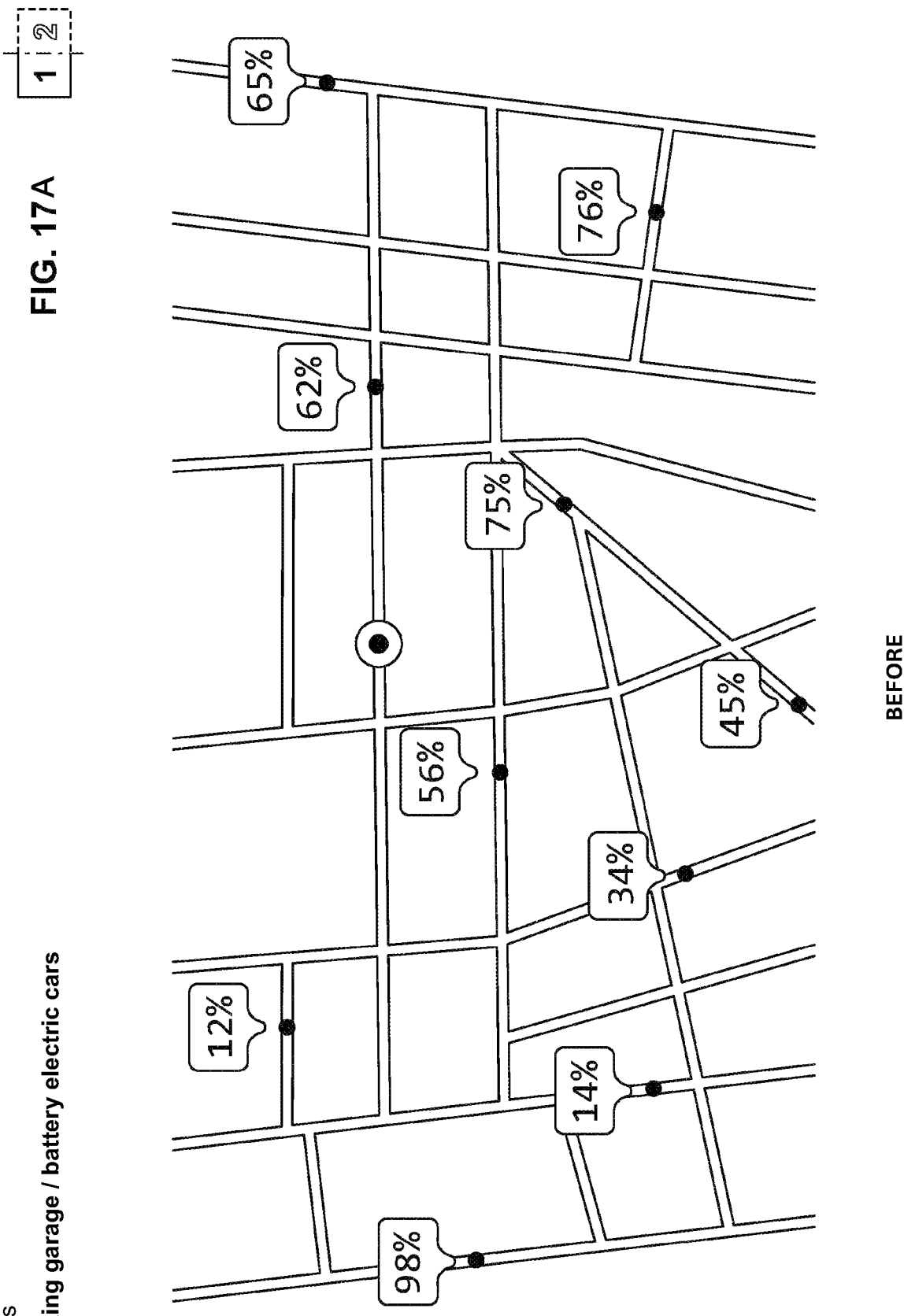
Figure 17B:
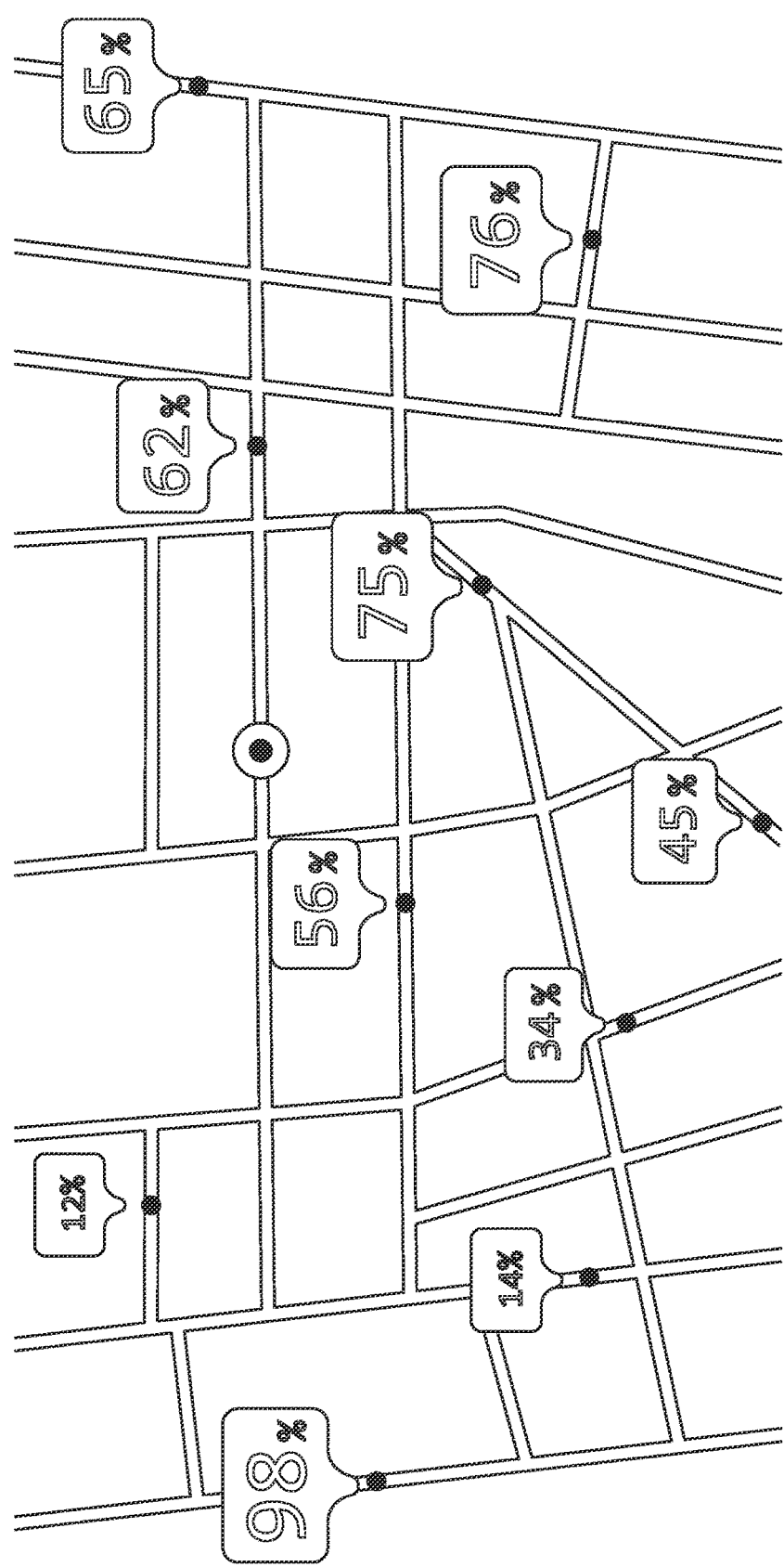
Figure 18A:
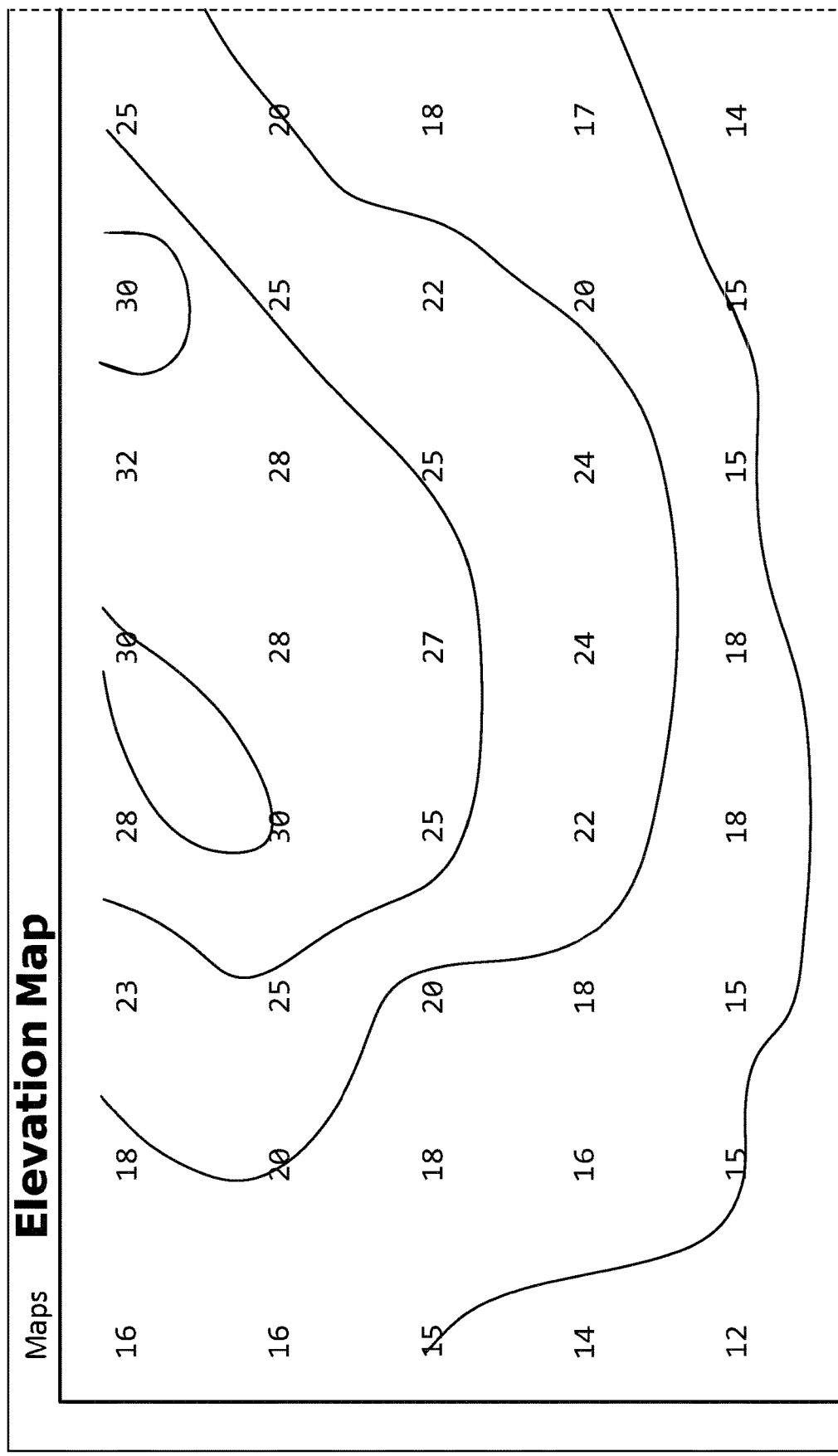
Figure 18B:
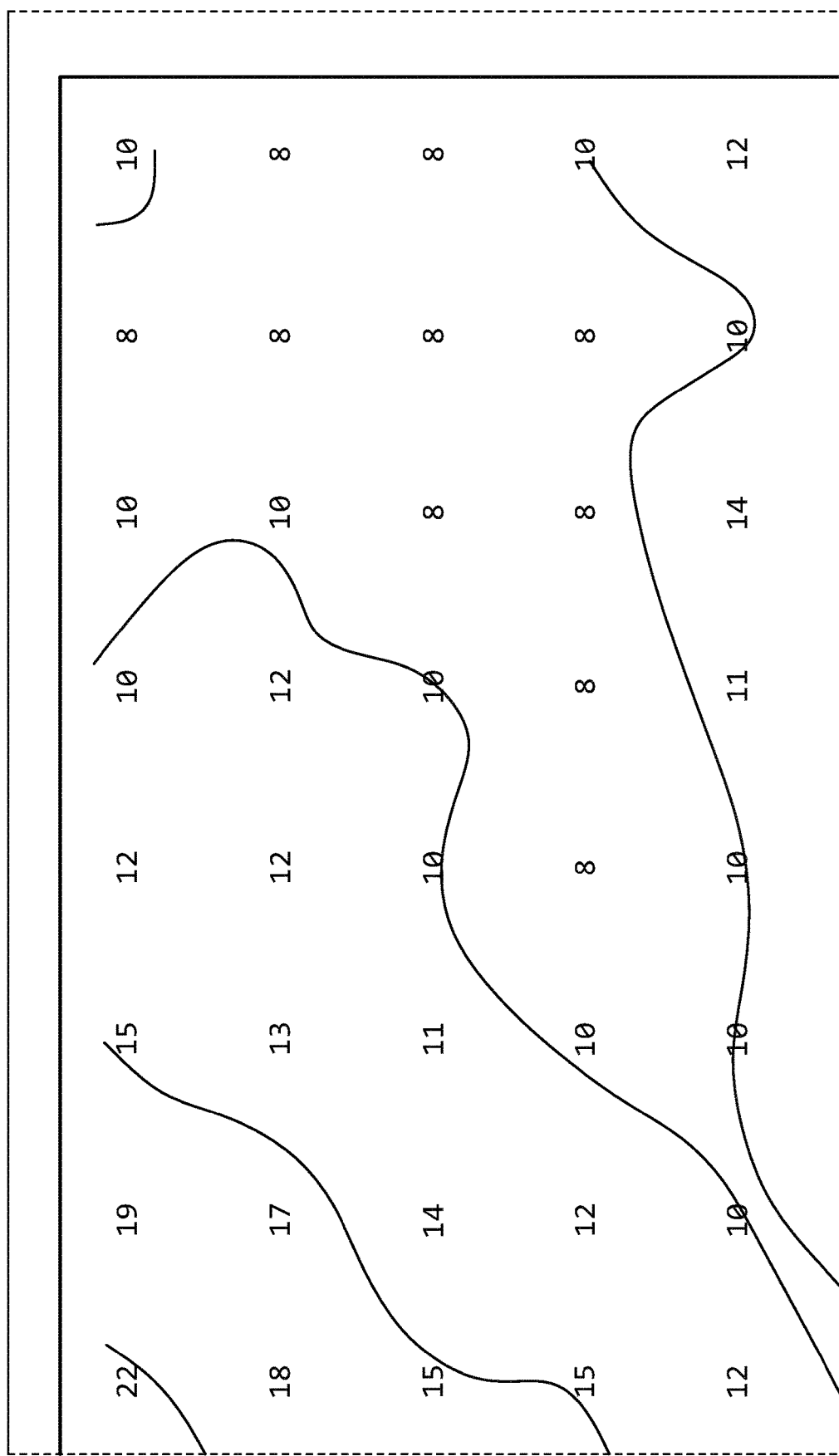
Figure 18C:
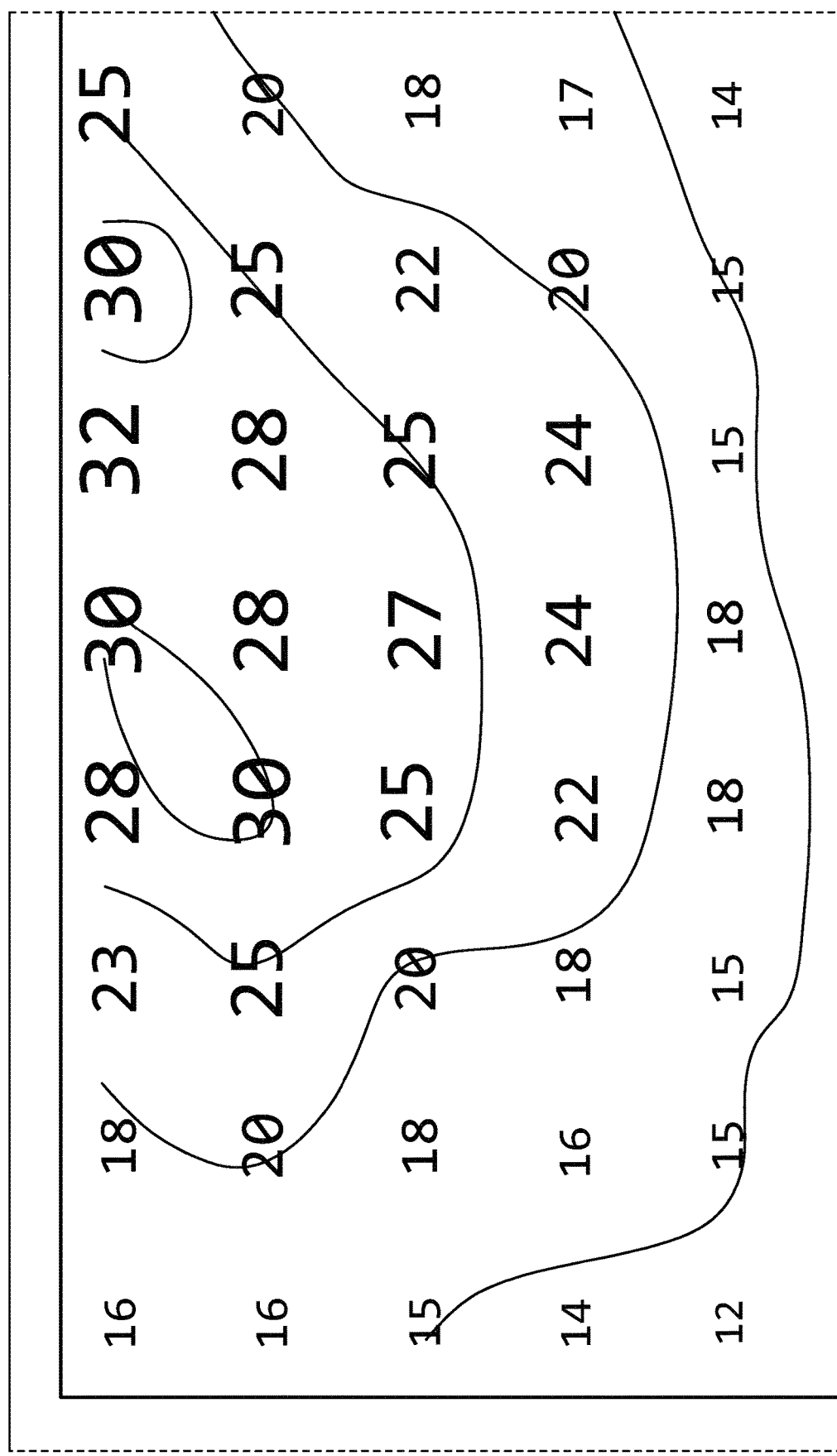
Figure 18D:
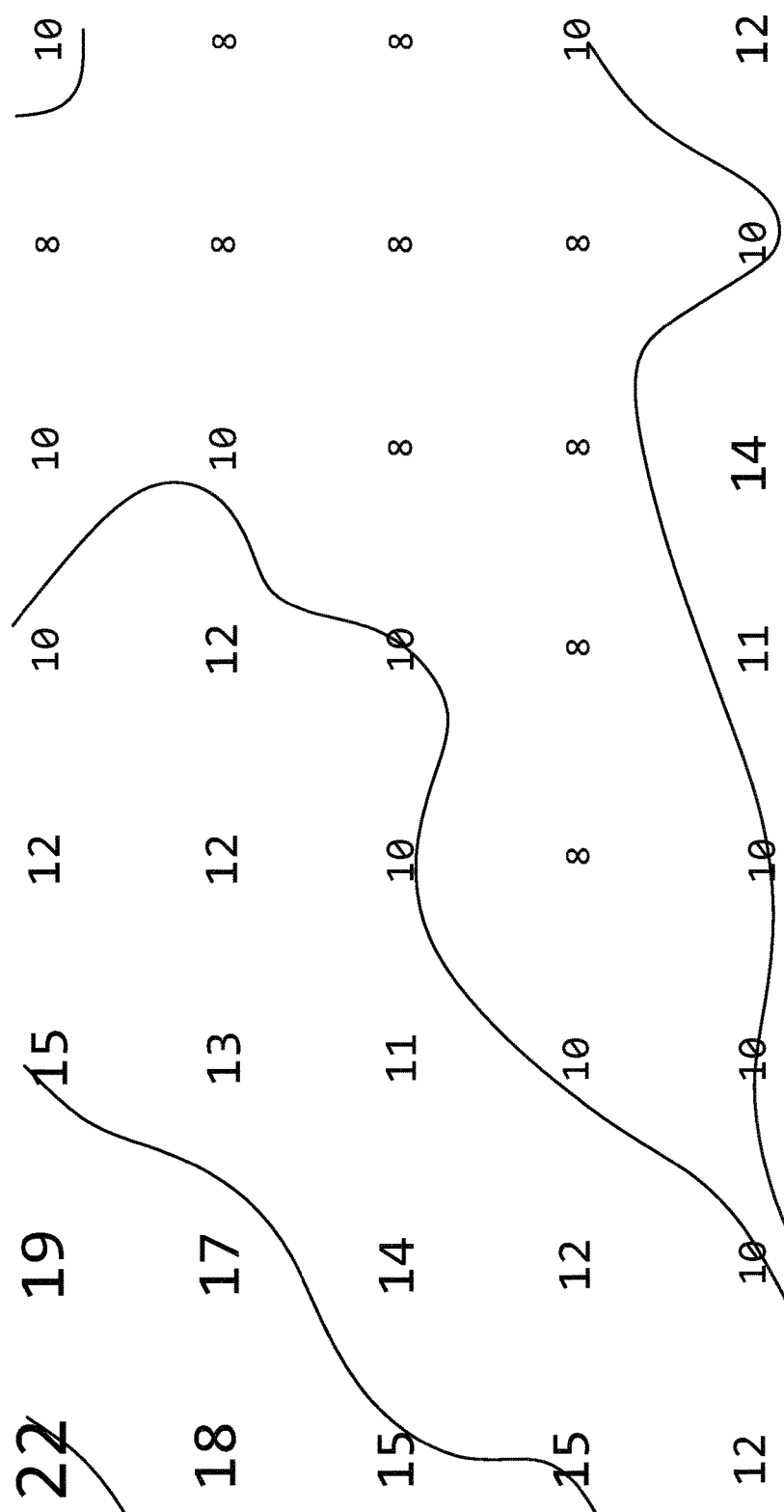
Figure 18E:
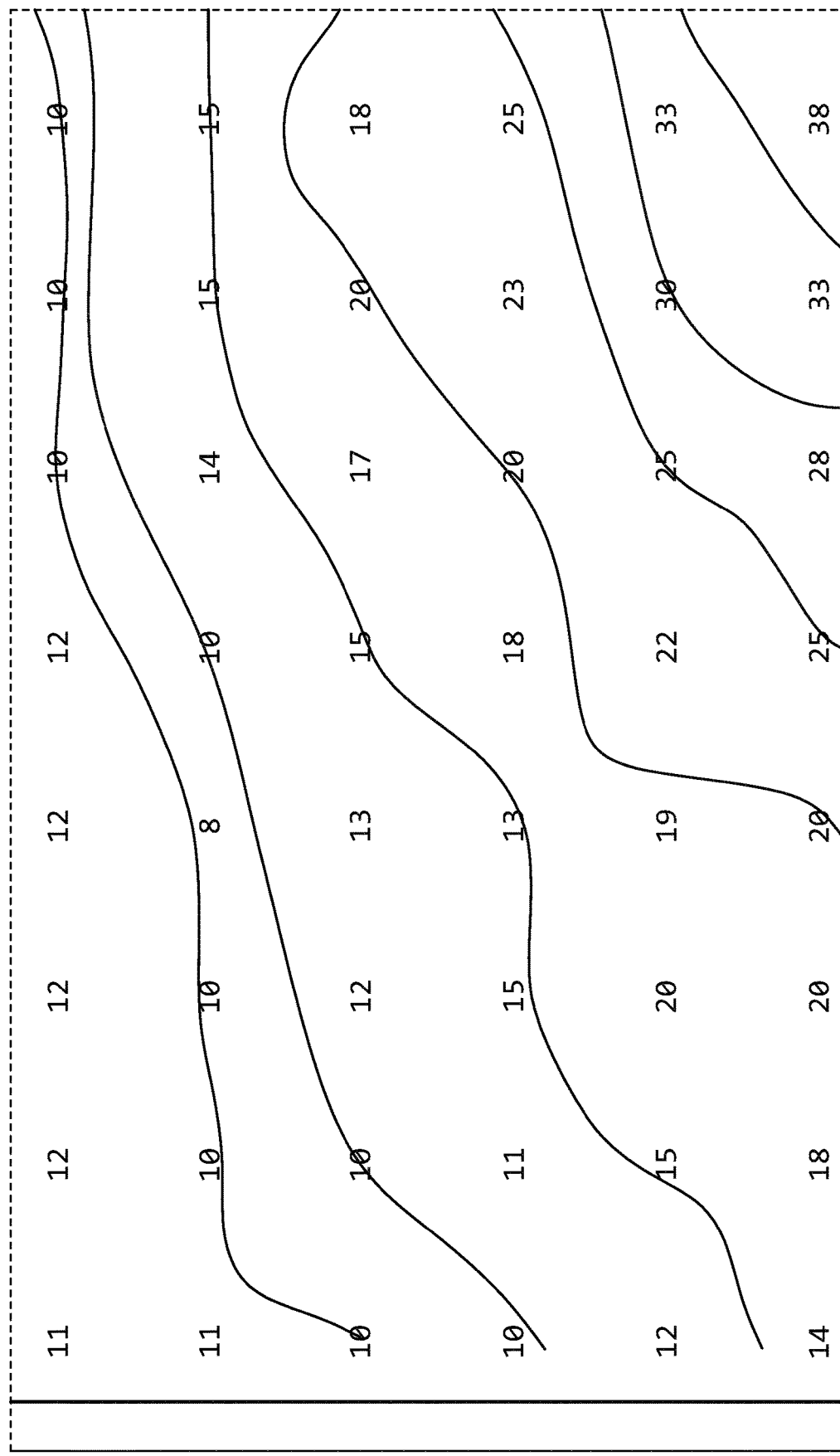
Figure 18F:
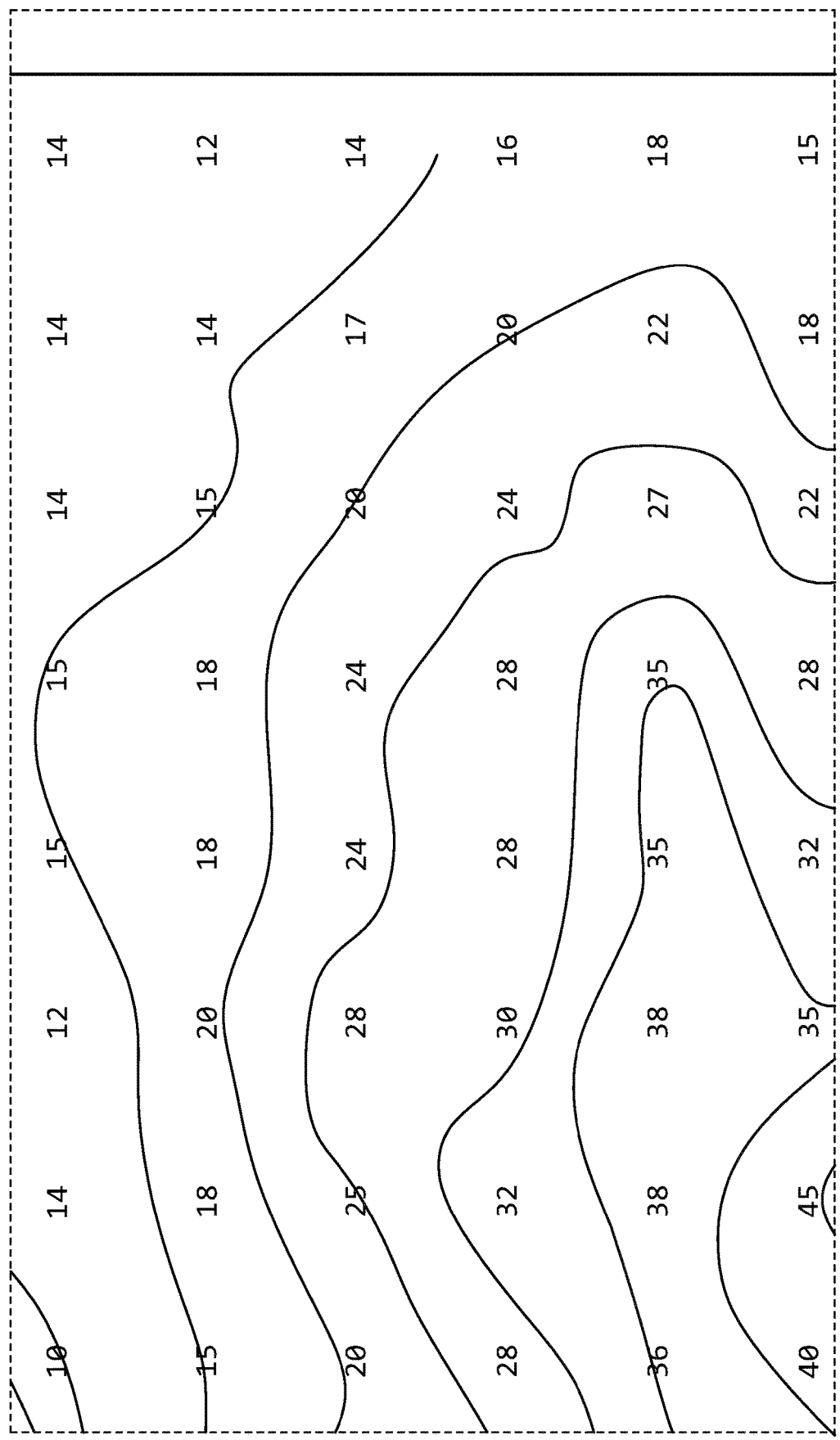
Figure 18G:
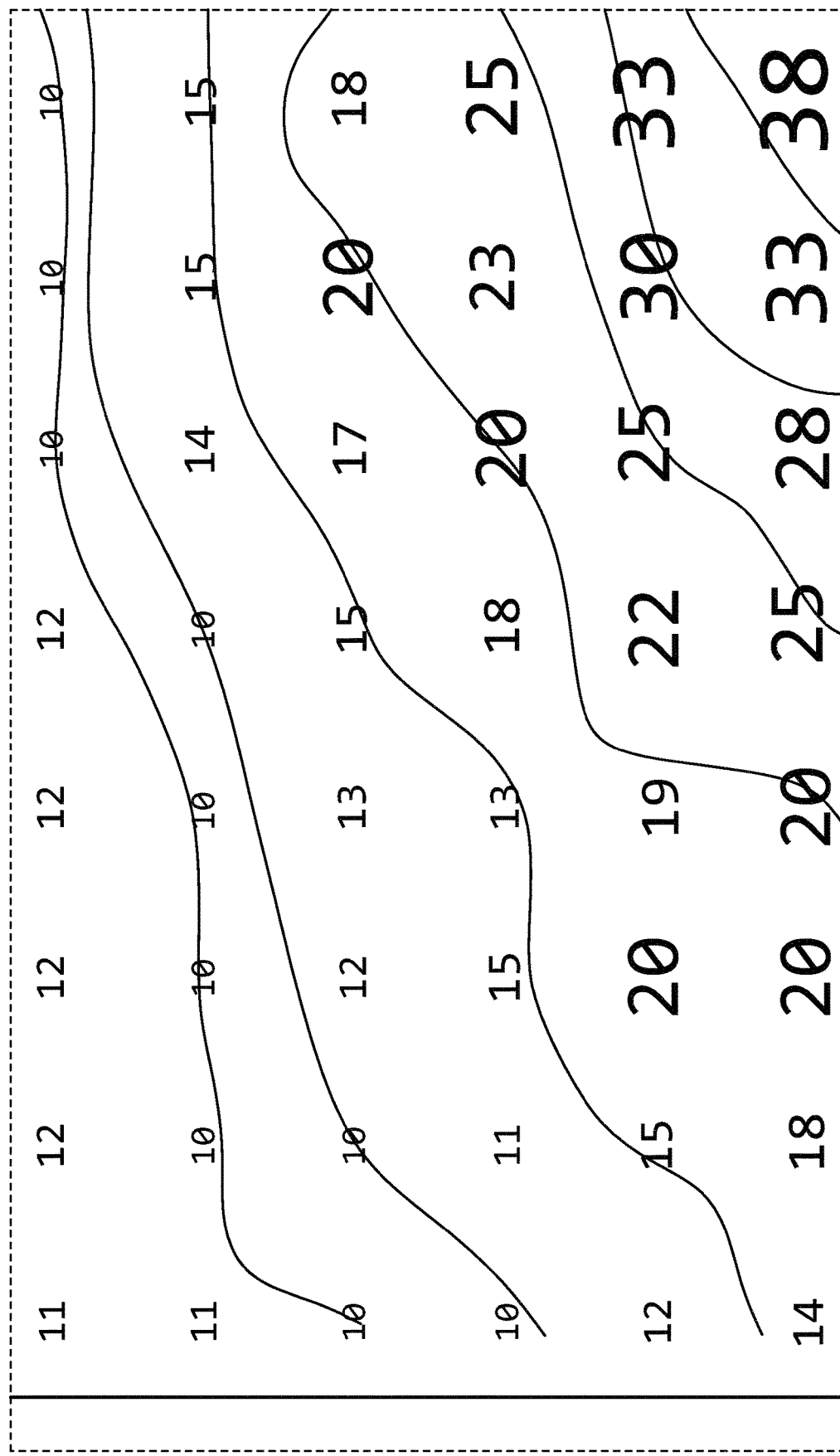
Figure 18H:
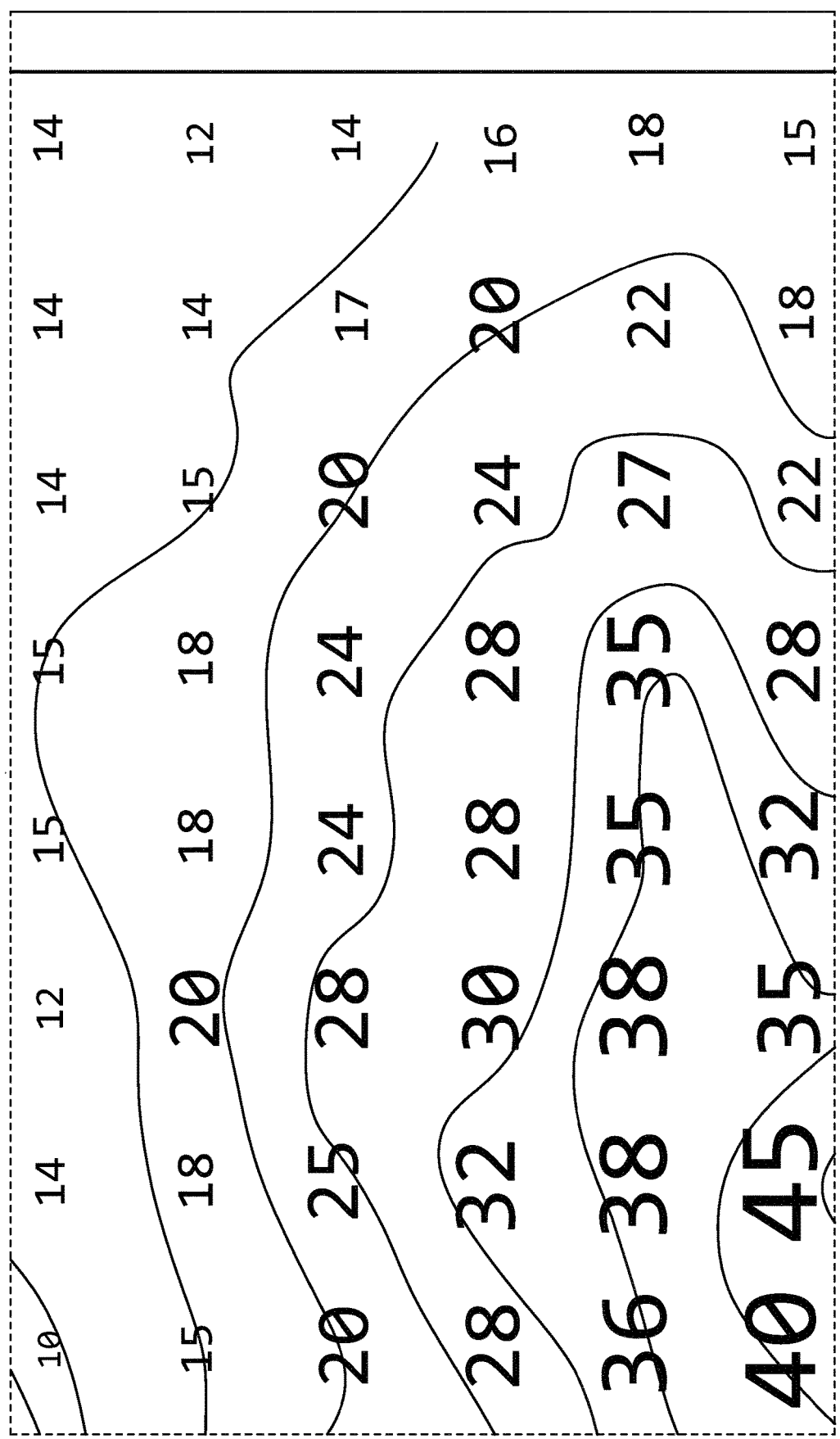
Figure 18I:
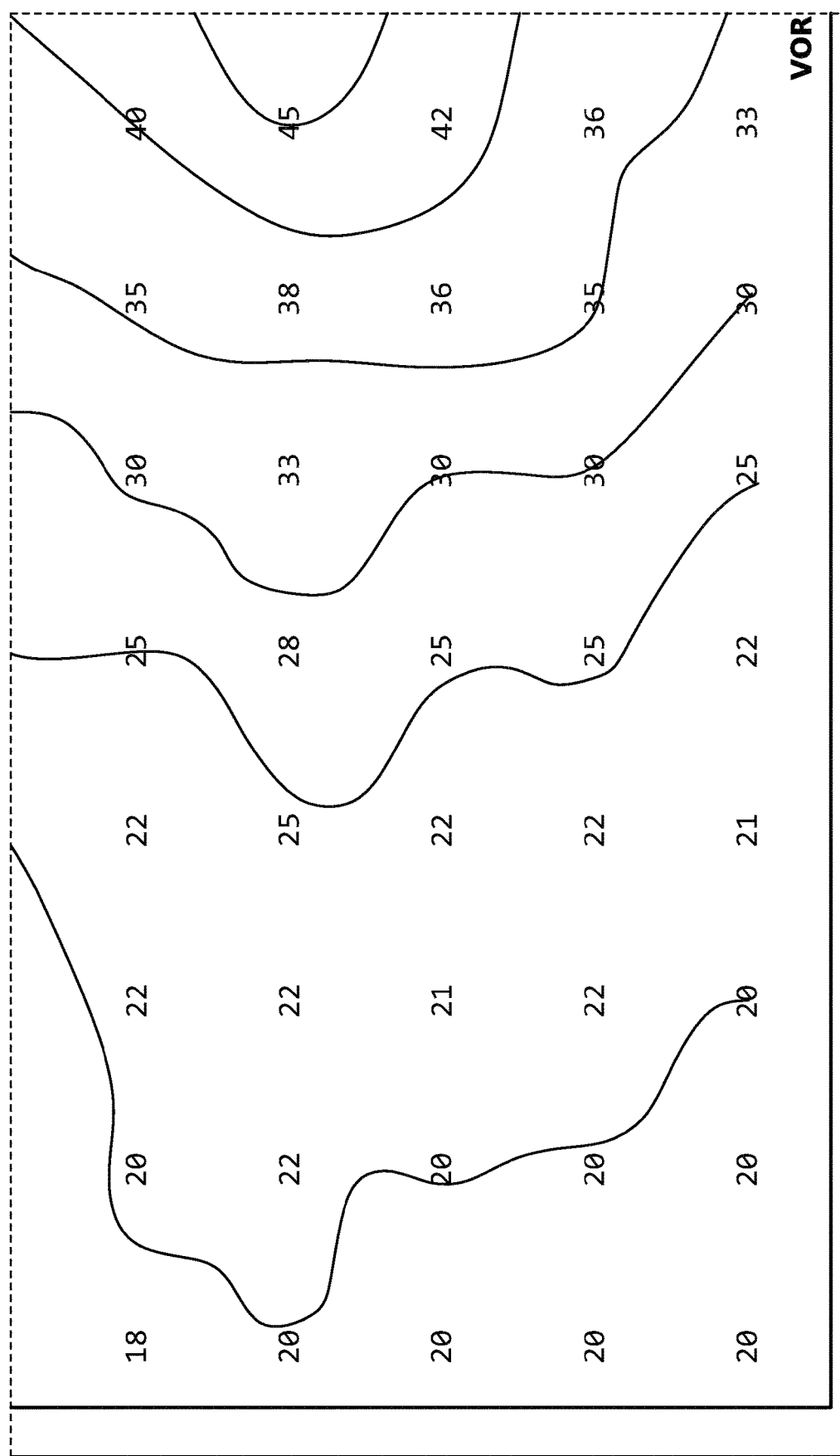
Figure 18J:
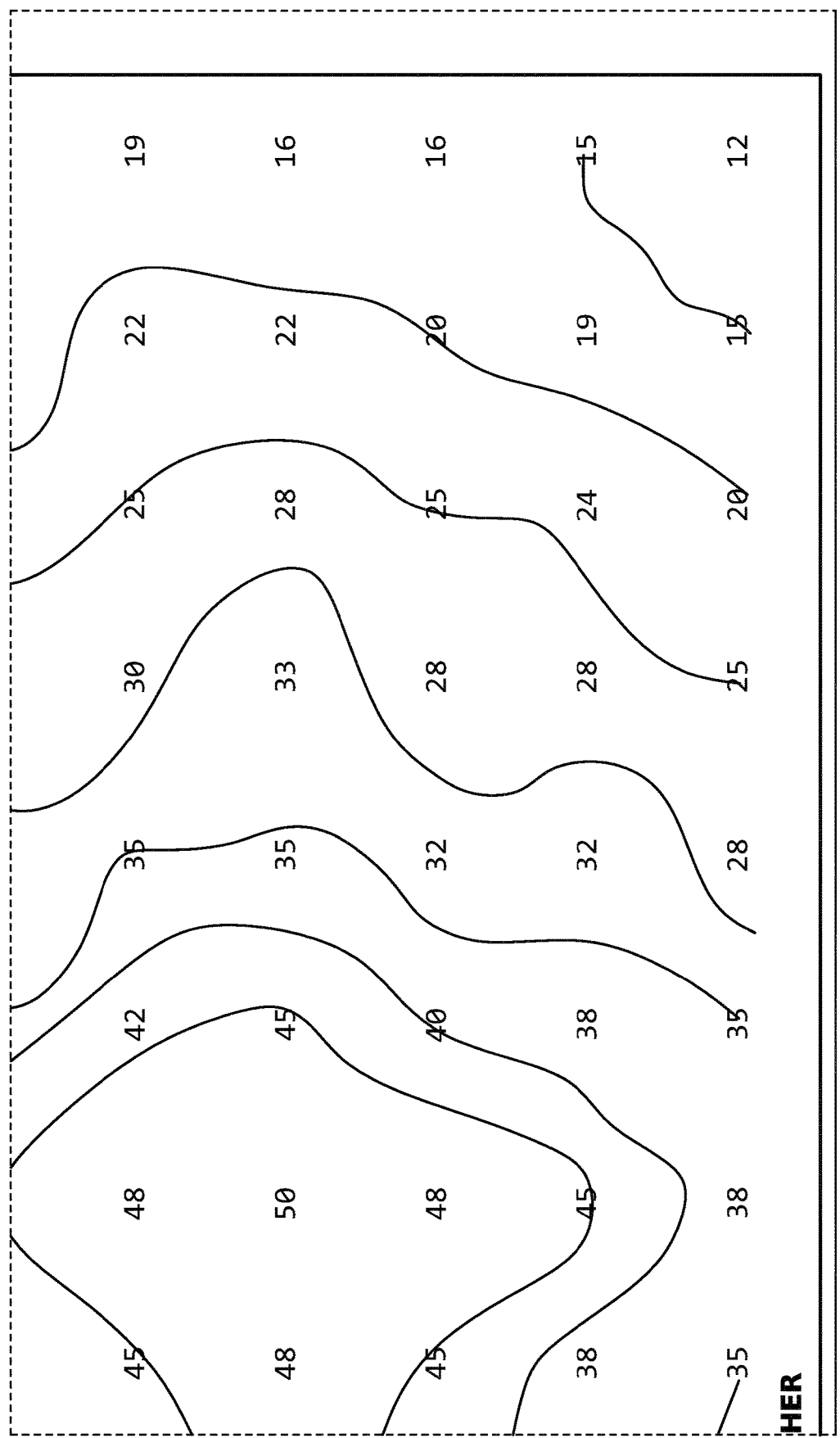
Figure 18K:
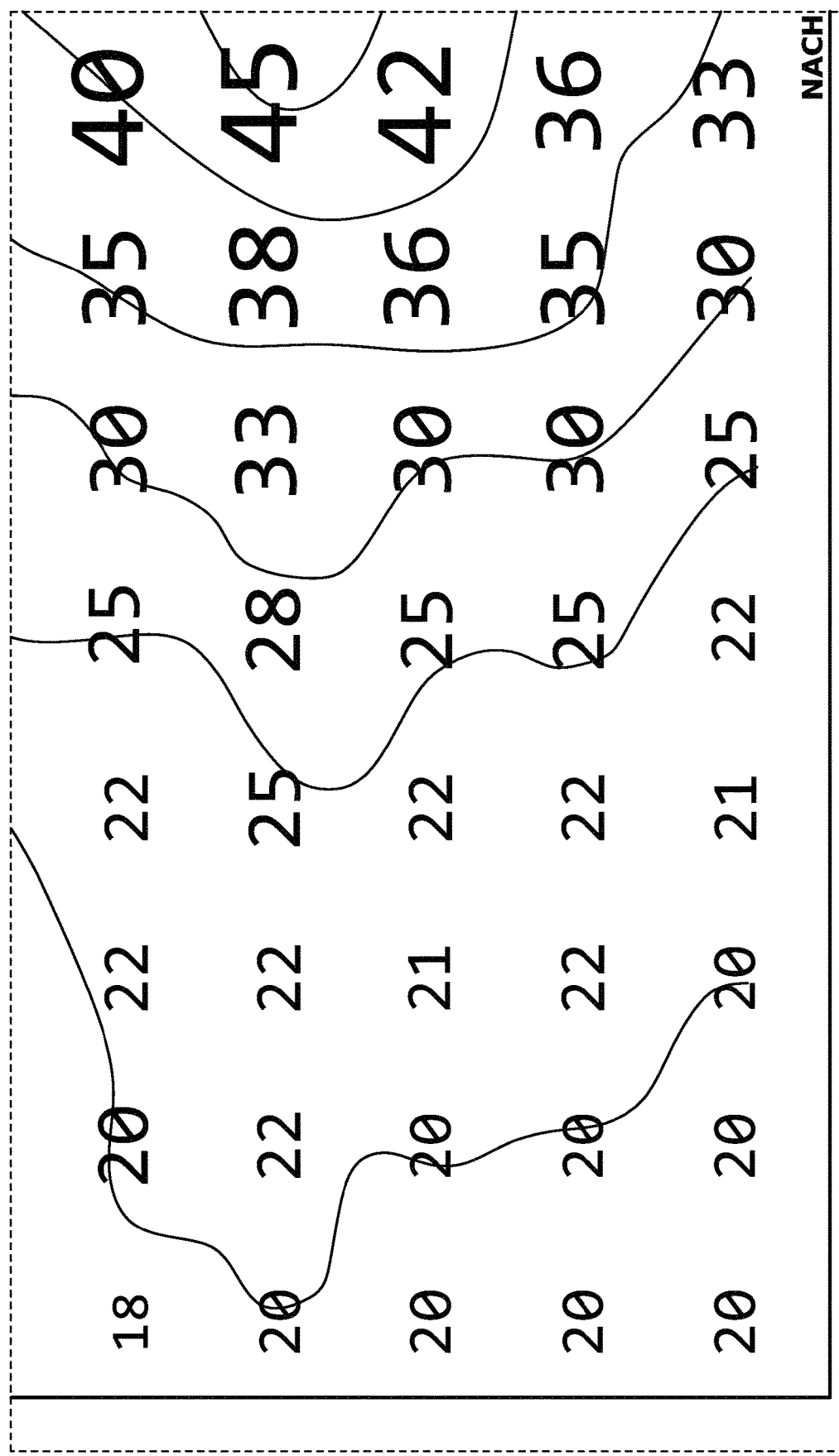
Figure 18L:
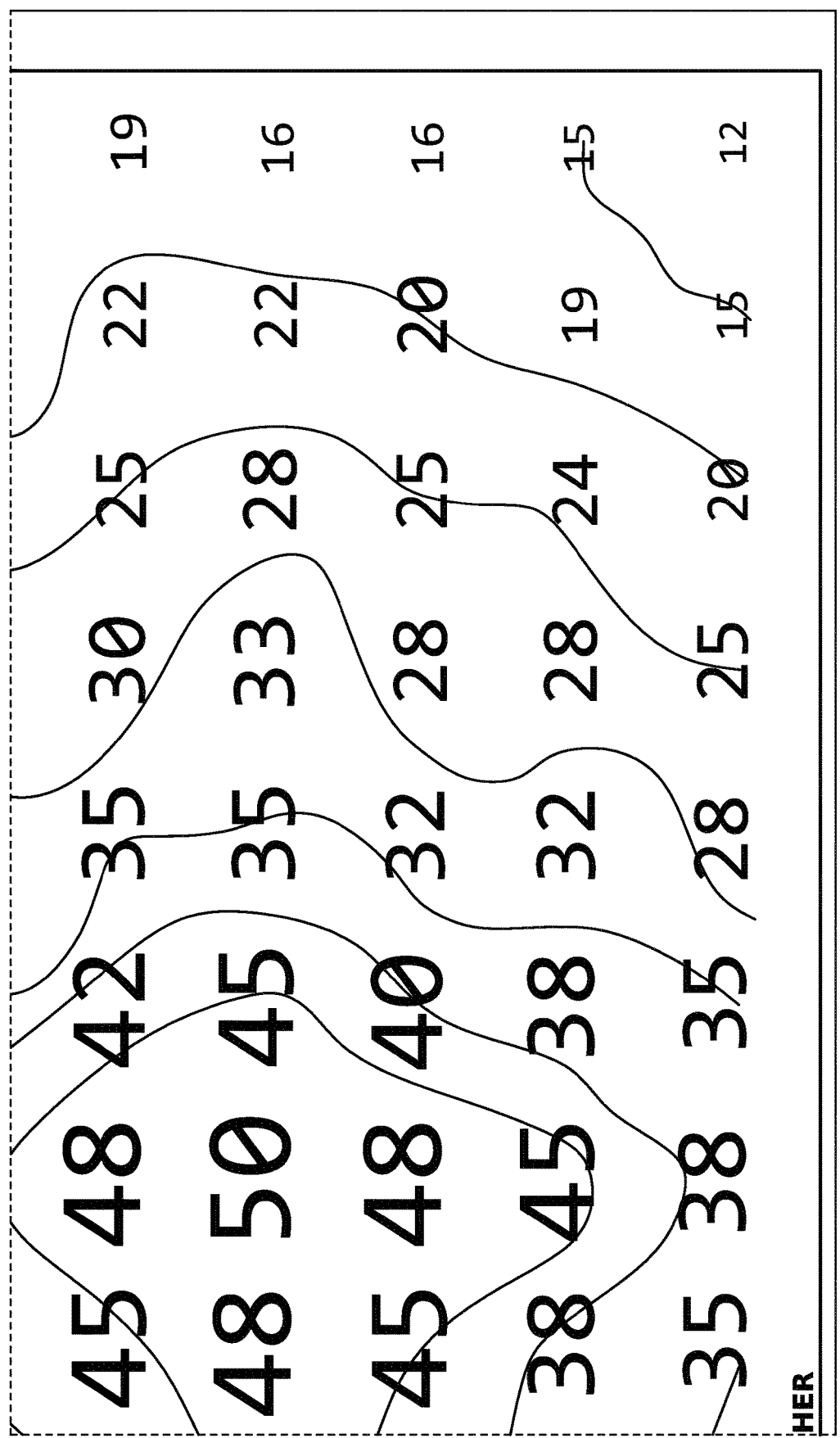

FIGS. 9, 14 and 17 show the reproduction according to the invention of numbers relating to technical data. The technical data can be, for example, operating parameters of a solar installation, the progress of a download and/or the states of charge of electric vehicles.

FIG. 10 shows the reproduction according to the invention of numbers relating to foods.

Figure 11A:
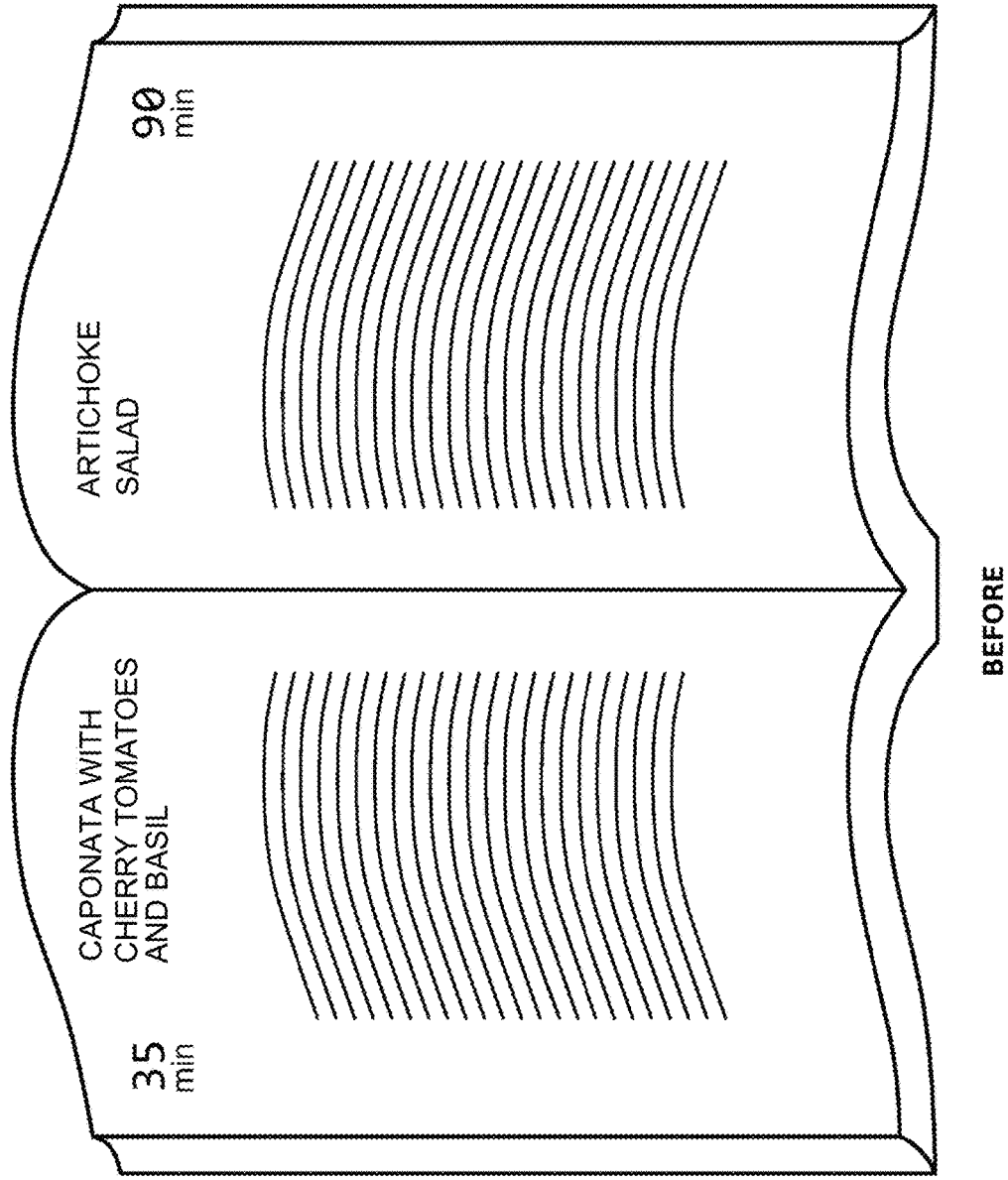
Figure 11B:
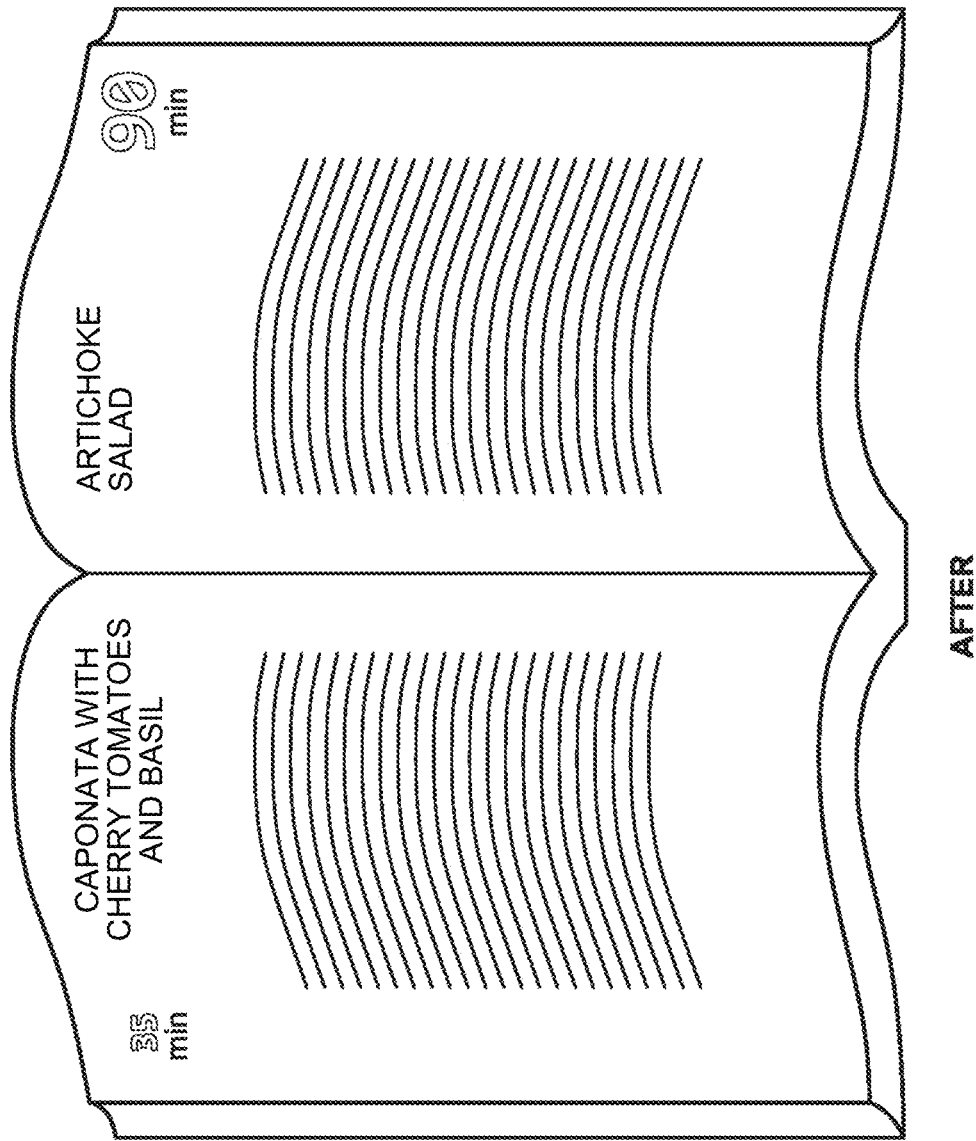

FIG. 11 shows a product produced according to the invention, which in the exemplary embodiment shown is a cookbook. In the course of the production of the cookbook, at least part of the layout of the book can be prepared by means of one of the methods according to the invention. The cookbook (or also any other printed material) is thus a product of the method according to the invention.

Figure 12A:
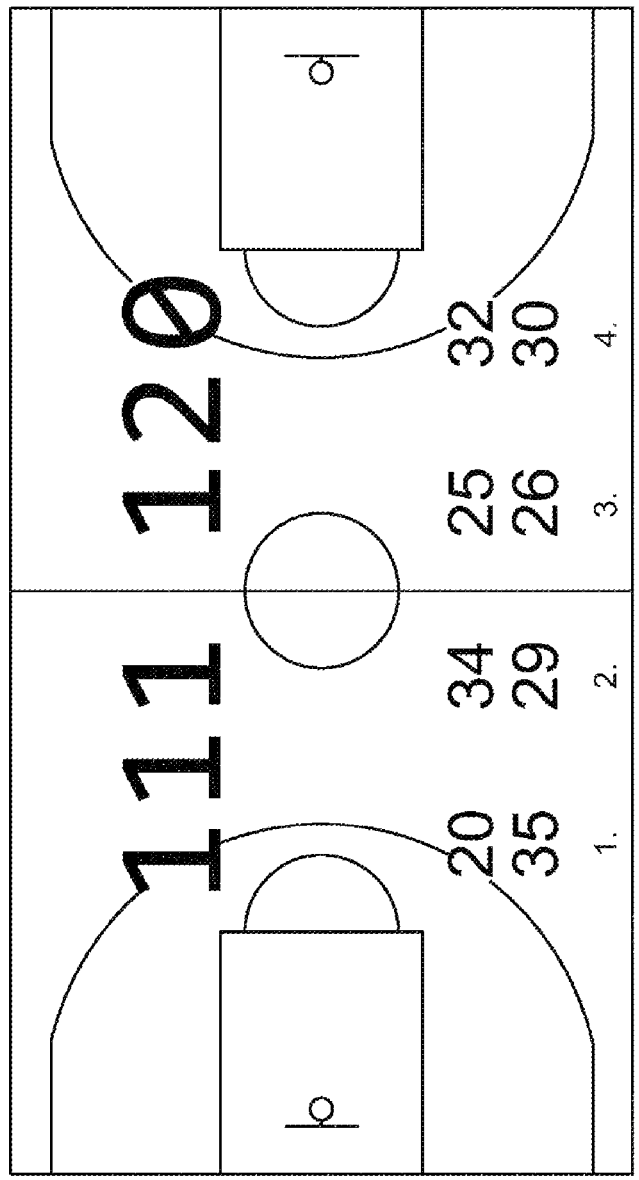

FIGS. 12 and 13 show reproductions according to the invention of numbers relating to sports results. FIG. 12, for example, shows results and interim results of a basketball game. FIG. 13 shows different reproduction possibilities according to the invention for lap times or lap data.

FIG. 15 shows a reproduction according to the invention of numbers relating to meteorological data. The data can be, for example, temperature values of a geographic region which are formatted according to their values. In this exemplary embodiment, particularly high temperatures are represented by particularly large characters, while a smaller font is allocated to lower temperatures.

Figure 16A:
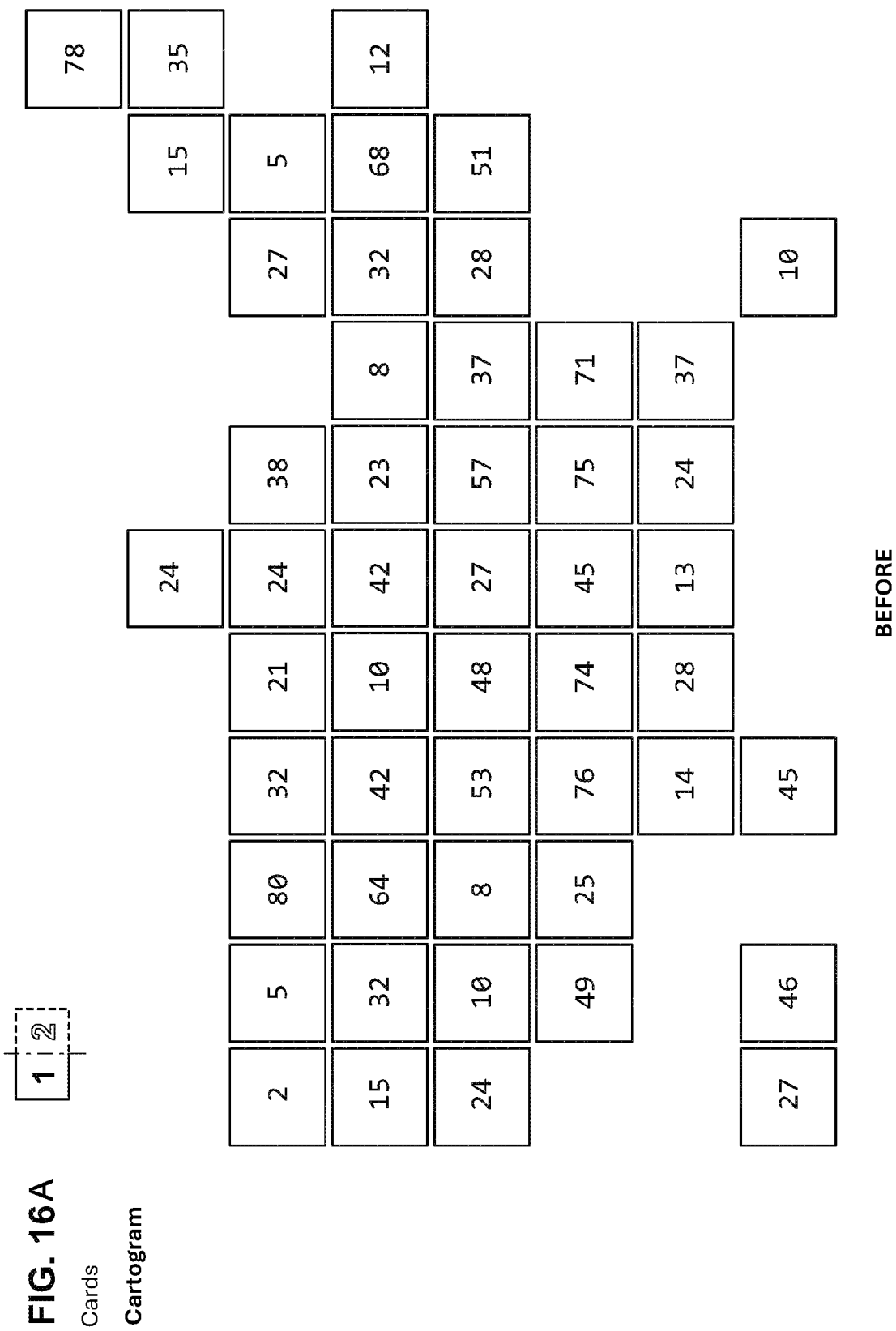
Figure 16B:
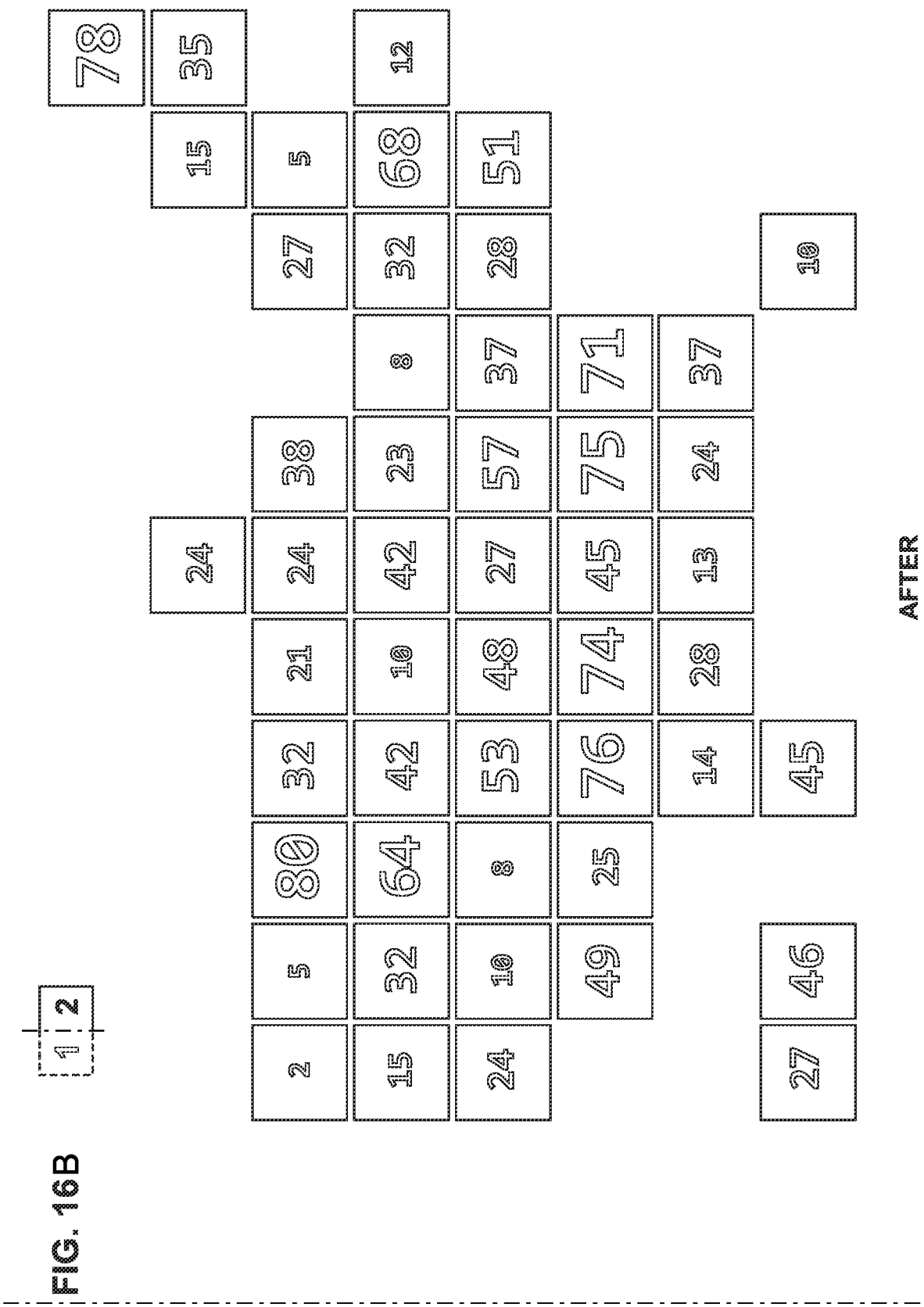

FIG. 16 shows a reproduction according to the invention of numbers relating to any other type of data, it being possible for the example shown to be any desired cartogram.

FIG. 18 shows a reproduction according to the invention of numbers relating to geographical data, it being possible for the reproduced numbers to be altitude readings of an elevation map.

FIG. 19 shows a reproduction according to the invention of numbers relating to calendar data, it being possible for the reproduced numbers to be the numbers of appointments on a given calendar day.

FIGS. 20-22 show a reproduction according to the invention of numbers relating in the broadest sense to economic data. FIG. 20 shows, using the example of a tabular listing of a national budget, how the reproduction of particularly relevant, that is to say in this example particularly large, numbers becomes clearer. FIG. 21 shows a similar effect to that shown in FIG. 20, data of a business report here being reproduced according to the invention. FIG. 22 shows the reproduction of further economic data, the formatting of the numbers here varying both in terms of color or color shade and in terms of the font size of the numbers.

By means of the present invention it is possible for a user who is usually confronted with a large amount of information, in particular numbers, quickly to ascertain which numbers are of particular importance and should therefore be given particular attention.

The user's attention can be drawn to particularly relevant numbers by their represented size and/or any desired color parameter of the number itself and/or of the background thereof, which are to be understood as meaning any desired parameters associated with the color, such as, for example, also the brightness, contrast, grey tones, type of color, color depth, etc.

The invention claimed is:

1. A device having reproduction means for reproducing numbers or numerical words, having determination means for calculating the value of the number or numerical word, and having allocation means which are configured to allocate to the number or numerical word, on the basis of the value of the number or numerical word calculated by the determination means, the size of the number or numerical word, wherein the reproduction means are configured to represent the number or numerical word on the reproduction means with the allocated size, and wherein the allocation means are configured to choose the size of the number or numerical word to be larger according to how large or small the value of the number or numerical word is or how close the value of the number or numerical word is to a reference value.

2. The device according to claim 1, wherein the allocation means are configured to allocate to the number or numerical word, on the basis of the value of the number or numerical word calculated by the determination means, at least one parameter relating to the color of the number or numerical word and/or of the background thereof and wherein the reproduction means are configured to represent the number or numerical word on the reproduction means with the allocated color parameter.

3. The device according to claim 2, wherein the parameter or parameters of the color is/are the type of color and/or the color depth.

4. The device according to claim 3, wherein the allocation means are configured to choose the color depth to be greater or lesser according to how large or small the value of the number or numerical word is or according to how close the value of the number or numerical value is to a reference value.

5. The device according to claim 1, wherein the reproduction means are so configured that exactly one number or exactly one numerical word is displayed simultaneously.

6. The device according to claim 1, wherein the reproduction means are so configured that a plurality of numbers or numerical words are displayed simultaneously.

7. The device according to claim 6, wherein the plurality of numbers or numerical words are displayed in an ordered manner or are components of a table.

8. The device according to claim 1, wherein the reproduction means are configured to arrange the numbers or numerical words sorted in dependence on their value.

9. The device according to claim 1, wherein the device is one of the following pieces of equipment or in that the device forms part of one of the following pieces of equipment: medical instrument, domestic appliance, tablet, smartphone, computer, television, computer monitor, sports equipment.

10. A method for reproducing numbers or numerical words, wherein the value of the number or numerical word is determined and in which there is allocated to the number or numerical word, on the basis of the determined value of the number or numerical word, the size of the number or numerical word, and wherein the number or numerical word is represented with the allocated size, wherein the size of the number of the numerical word is larger according to how large or small the value of the number of the numerical word is and/or how close the value is to a reference value.

11. The method according to claim 10, wherein there is allocated to the number or numerical word, on the basis of the determined value of the number or numerical word at least one parameter of the number or numerical word relating to the color and/or of the background thereof, and wherein the number or numerical word is represented with the allocated color parameter.

12. The method according to claim 11, wherein the parameter or parameters of the color is/are the type of color or the color depth.

13. The method according to claim 12, wherein the color depth is chosen to be greater according to how large or small the value of the number or numerical word is and/or how close the value is to a reference value.

14. The method according to claim 10, wherein exactly one number or exactly one numerical word is displayed.

15. The method according to claim 10, wherein a plurality of numbers or numerical words are displayed simultaneously.

16. The method according to claim 15, wherein the plurality of numbers or numerical words are displayed in an ordered manner or are components of a table.

17. The method according to claim 10, wherein the numbers or numerical words are arranged in dependence on their value.

18. The method according to claim 10, wherein the numbers or numerical words are numbers or numerical words that are selected from the following fields: medical values, sports results, positions in tables, technical data, meteorological data, geographical data, food ingredients and/or calendar data.

19. A product produced by the method of claim 10.

20. The product according to claim 19, wherein the product is printed material.

* * * * *